(12) United States Patent
Falls et al.

(10) Patent No.: US 12,315,946 B2
(45) Date of Patent: May 27, 2025

(54) CONFIGURABLE VEHICLE BATTERY BACKPLANE AND MODULES AND METHODS OF OPERATING THE SAME

(71) Applicant: Flyer Next, LLC, Los Angeles, CA (US)

(72) Inventors: Bruce Falls, Dove Canyon, CA (US); Scott Kochan, Trabuco Canyon, CA (US); Oded Nechushtan, Marina Del Rey, CA (US); Adam Adelson, Las Vegas, NV (US)

(73) Assignee: Flyer Next, LLC, Los Angeles, CA (US)

( * ) Notice: Subject to any disclaimer, the term of this patent is extended or adjusted under 35 U.S.C. 154(b) by 0 days.

(21) Appl. No.: 18/756,829

(22) Filed: Jun. 27, 2024

(65) Prior Publication Data
US 2024/0347829 A1    Oct. 17, 2024

Related U.S. Application Data

(60) Division of application No. 18/469,685, filed on Sep. 19, 2023, which is a division of application No.
(Continued)

(51) Int. Cl.
*H01M 50/204* (2021.01)
*H01M 50/342* (2021.01)
(Continued)

(52) U.S. Cl.
CPC ..... *H01M 50/204* (2021.01); *H01M 50/3425* (2021.01); *H01M 50/509* (2021.01);
(Continued)

(58) Field of Classification Search
CPC .......... H01M 50/204; H01M 50/3425; H01M 50/509; H01M 50/519; H01M 50/593; H01M 2200/20; A62C 3/16
See application file for complete search history.

(56) References Cited

U.S. PATENT DOCUMENTS 10,923,694 B1 * 2/2021 Pack ................ H01M 6/42
11,901,572 B2 2/2024 Falls et al.
(Continued)

OTHER PUBLICATIONS

International Search Report and Written Opinion of the International Search Authority issued in International Application No. PCT/2022/046731, mailed Mar. 14, 2023, 14 pages.

*Primary Examiner* — Michael L Dignan
(74) *Attorney, Agent, or Firm* — Sterne, Kessler, Goldstein & Fox PLLC

(57) ABSTRACT

An energy storage/battery system is disclosed. The system can include a multi-voltage configurable module (MVCM) and a multi-voltage configurable backplane (MVCB) that form the system. A method of manufacture of an MVCM can include placing a plurality of battery cell isolation sleeves within a body of a main housing, placing a plurality of battery cells within a cavity of the plurality of battery cell isolation sleeves, attaching a printed circuit board to a bottom portion of the main housing, the printed circuit board being coupled to a plurality of output terminals, coupling a plurality of conducting nails to the plurality of battery cells and the printed circuit board, wherein the plurality of conducting nails extend from a cathode side of the plurality of battery cells to the printed circuit board when so coupled, and attaching a top cover to a top portion of the main housing.

21 Claims, 20 Drawing Sheets

Related U.S. Application Data

18/081,344, filed on Dec. 14, 2022, now Pat. No. 11,901,572, which is a continuation of application No. PCT/US2022/046731, filed on Oct. 14, 2022.

(60) Provisional application No. 63/256,934, filed on Oct. 18, 2021, provisional application No. 63/318,740, filed on Mar. 10, 2022, provisional application No. 63/375,645, filed on Sep. 14, 2022.

(51) Int. Cl.
  *H01M 50/509* (2021.01)
  *H01M 50/519* (2021.01)
  *H01M 50/593* (2021.01)
  *A62C 3/16* (2006.01)

(52) U.S. Cl.
  CPC ....... *H01M 50/519* (2021.01); *H01M 50/593* (2021.01); *A62C 3/16* (2013.01); *H01M 2200/20* (2013.01); *H01M 2220/20* (2013.01)

(56) References Cited

U.S. PATENT DOCUMENTS

| | | | |
|---|---|---|---|
| 2014/0069665 A1* | 3/2014 | Fernstrum | A62C 37/04 169/61 |
| 2014/0272498 A1* | 9/2014 | Duncan | H01M 10/48 429/90 |
| 2017/0005371 A1 | 1/2017 | Chidester et al. | |
| 2017/0256770 A1 | 9/2017 | Wynn et al. | |
| 2018/0099579 A1 | 4/2018 | Hale | |
| 2019/0296281 A1 | 9/2019 | Elsberry | |
| 2019/0379018 A1* | 12/2019 | Varatharajah | H01M 50/529 |
| 2020/0042062 A1* | 2/2020 | Astefanous | H02J 7/0068 |
| 2020/0343491 A1 | 10/2020 | Jiang et al. | |
| 2021/0050578 A1* | 2/2021 | Fedyna | H01M 50/503 |
| 2021/0167343 A1* | 6/2021 | Kwag | H01M 10/4257 |
| 2021/0167453 A1* | 6/2021 | Kawakami | H01M 50/207 |
| 2021/0202921 A1* | 7/2021 | Reimer | H01M 10/425 |
| 2022/0216558 A1 | 7/2022 | Alsakka et al. | |
| 2022/0231516 A1 | 7/2022 | Trela et al. | |
| 2022/0263172 A1* | 8/2022 | Hofer | H01M 50/227 |
| 2023/0071975 A1 | 3/2023 | Singer et al. | |
| 2024/0006697 A1 | 1/2024 | Falls et al. | |

\* cited by examiner

CONFIGURABLE VEHICLE BATTERY BACKPLANE AND MODULES AND METHODS OF OPERATING THE SAME

CROSS-REFERENCE TO RELATED APPLICATIONS

This application is a Divisional of U.S. application Ser. No. 18/469,685, filed on Sep. 19, 2023, now U.S. Pat. No. 12,062,800, which is a Divisional of U.S. application Ser. No. 18/081,344, filed on Dec. 14, 2022, now U.S. Pat. No. 11,901,572, which is a Continuation of Patent Cooperation Treaty (PCT) Application No. PCT/US2022/046731, filed on Oct. 14, 2022, which claims priority to U.S. Provisional Appl. No. 63/256,934, filed on Oct. 18, 2021; U.S. Provisional Appl. No. 63/318,740, filed on Mar. 10, 2022; and U.S. Provisional Appl. No. 63/375,645, filed on Sep. 14, 2022. The content of each of these applications is incorporated by reference in its entirety herein.

FIELD

Aspects relate to an energy storage/battery system.

BACKGROUND

The move towards clean energy is prompting renewed interest, research, and development in the area of energy storage. Specifically, battery systems. Battery systems are critical to many clean energy technologies. Applications for the use of battery systems are varied. One area garnering significant attention is the field of electric vehicles (EVs). EVs have specific energy requirements and need specialized battery systems. EVs require energy efficient and safe battery systems that have sufficient power to enable EVs to travel for long distances without the need for the batteries to be recharged. The batteries also need to be powerful enough to power the vehicle and all the on board computer systems.

Conventional battery systems used in EVs suffer from several shortcomings. First, conventional systems are not configurable, cannot be scaled, and are expensive to replace if any one component breaks. For example, conventional systems typically consist of battery cells that are integrated into one large sealed housing. The housing is often difficult to disassemble in instances where parts have to be examined or replaced. Often, their disassembly requires persons with specialized training on how to handle high voltage electronics. Moreover, the sealed housing typically has all the control circuitry that controls the battery pack coming online and offline. Thus, if any cell or circuitry is deficient, it might be more efficient to simply replace the entirety of the housing. This can be wasteful because working components will also be discarded.

Second, conventional systems are implemented such that the battery cells are uniform and cannot be mixed with other cell types. That is, they consist of one cell type (e.g., Lithium-Ion batteries, Nickel-metal hydride batteries, etc.). Even if they consist of one cell type all the cells must have the exact same cell chemistry. Thus, cells typically have to be from the same manufacturer, be of the same model, have the same cell chemistry, etc. and cannot be intermixed with other battery cell types.

Third, conventional systems are not versatile. Thus, a battery system that is built for one vehicle cannot be easily modified to work with other vehicles without significant expense or reconfiguration.

Fourth, conventional systems typically cannot have their output voltage adjusted dynamically. Systems are typically made to output a certain fixed voltage. These are usually high voltages in the range of 400V to 800V. These high voltage systems require special precautions when handling, shipping, or installing the energy components because of regulations for systems working in these voltage ranges. Often, these systems also require personnel with specialized training to install or fix anything that goes wrong with the battery systems due to their high voltage nature.

Fifth, conventional systems are not designed to have battery cells replaced. This is because battery cells are integrated into one large sealed housing and in many cases the cells are mechanically grouped where individual disassembly is not possible. The housing is often difficult to disassemble in instances where parts have to be examined or replaced. This makes conventional systems difficult/impractical to refurbish if any individual battery cell fails (or a new cell technology makes refurbishment desirable).

Sixth, conventional systems do not have operational redundancy. A single point of failure typically results in loss of function of the entirety or large portions of the system, making the system inoperable.

Seventh, conventional automotive battery packs are vulnerable to thermal runaway if there is a cell thermal runaway which can present safety issues for occupants and large material damages.

Thus, improved energy storage/battery systems are needed to overcome one or more of the aforementioned shortcomings and to provide improved and more adaptable battery systems.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
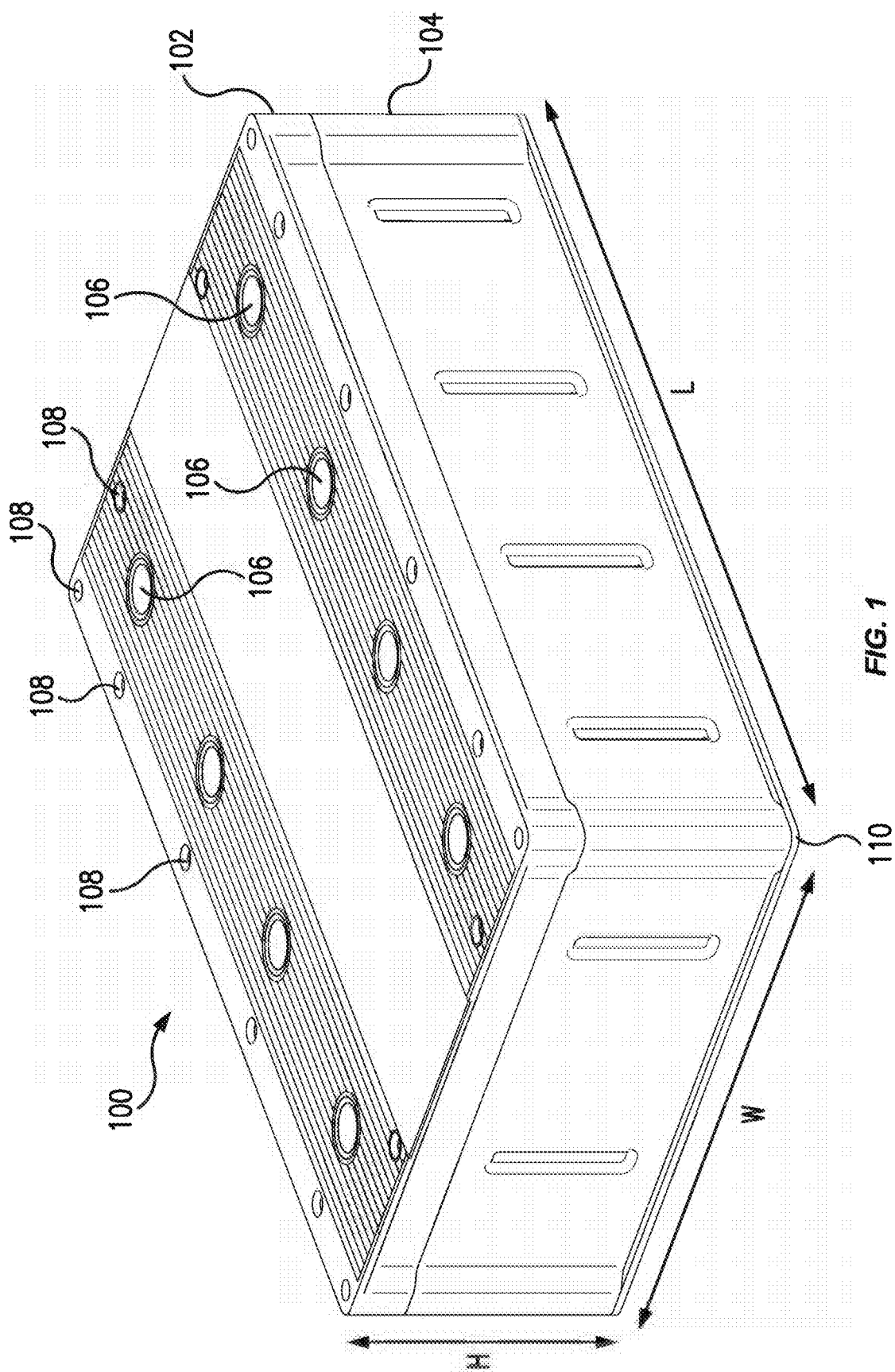
FIG. 1 shows a multi-voltage configurable module (MVCM) according to aspects of the disclosure.

Aspects disclosed herein provide a novel energy storage/battery system. The system provides a novel architecture over conventional systems as will be described. This architecture may provide several benefits.

First, it allows the battery system to be configurable both mechanically and electrically. Conventional battery systems are not configurable in both respects. For example, the disclosed battery system can be configured mechanically in any of a variety of shapes using a multi-voltage configurable backplane (MVCB). The configuration can determine how multi-voltage configurable modules (MVCMs), which are the energy blocks of the system, are applied. In this way, the system's mechanical architecture can affect the system's electrical output.

Second, the system allows for easy plug-in and removal of MVCMs. Circuitry on the MVCB can control the dynamic onboarding and offloading of the MVCMs as they are plugged-in or removed from the MVCB. The ability to plug-in and remove modules adds to the configurability of the system. Additionally, it allows the system to be implemented in a modular fashion. This modular design allows for easy replacement and/or isolation of faulty MVCMs. The ability to isolate, remove, and replace faulty MVCMs allows for increased safety, stability, and performance over conventional systems, because any faulty components can have their effects on the overall system minimized.

Third, the modular design, in which individual MVCMs can be plugged into the overall system, allows for the mixing of battery chemistries as long as the operating voltage range of each of the MVCMs is compatible. Conventional systems have their battery cells as being uniform and consisting of one cell type (e.g., Lithium-Ion batteries, Nickel-metal hydride batteries, etc.). These battery cells must also have the exact same chemistries. The system disclosed herein differs from conventional systems because each of the MVCMs can contain battery cells of different chemistries as long as the operating voltage range of each of the battery cells is the same. Thus, an MVCM could have cells that are good at providing peak power along with MVCMs that have cells that have excellent energy characteristics. So long as each of the MVCMs are able to interface with the MVCB, they can be brought on and offline and integrated within the overall system. Thus, the system allows for a hybrid energy storage system.

Fourth, the modular design also allows the system to scale. Unlike conventional systems, MVCMs can be added and removed to scale up or scale down the energy capacity of the system. This allows the system to be used in multiple applications spanning large voltage, power, and capacity requirements. For example, the same system architecture and design disclosed can be used in an appliance, home energy storage, electric vehicle (EV), aerospace/airplane applications, and large grid-tie system applications.

Fifth, the compartmental design can improve the overall safety of the system. This is because each individual MVCM has multiple low voltage segments that are electrically and mechanically isolated by thermal barriers, which allows for significantly lower energy to dissipate in the case of a cell thermal runaway or catastrophic failure. The MVCM, prior to being plugged in to a system is low voltage (or remains low voltage if the system is configured that way). In this way, there is less energy release for each individual MVCM in case any individual MVCM fails. Moreover, isolating each of the MVCMs provides barriers to block the spread of any fire or electrical discharge in the case of a cell thermal runaway or catastrophic failure of an MVCM. Additionally, the active switches can be opened in the event of a crash (similar to deploying airbags) which greatly reduces the opportunity for a short if there is a mechanical breach of the system. Conventional battery packs do not have this feature.

Sixth, the system is designed to make it simple and efficient to replace battery cells if any of the cells fails or a newer cell chemistry is desirable. This can be done without disruption to the functioning and design of the overall system. Thus, the system makes refurbishment of battery cells possible.

Seventh, the system is designed to provide operational redundancy. For example, the modular design allows groups of battery cells to be swapped in and out without interrupting the overall function of the system. Thus, no single point of failure results in loss of function of the entirety of the system.

Each individual battery cell grouping in an MVCM can be configured to deliver 48 Volts (V) output. Depending on how the MVCMs are configured, different numbers of cell groupings can be installed within the MVCM. In aspects, 8 or 16 groups of cells can be installed in an MVCM resulting in an MVCM being able to deliver 48V or any multiple including 350V or 750V. MVCMs can be added to the system to increase the overall capacity that the system can deliver. However, configuration jumpers can control the voltage output of these MVCMs such that lower voltages can be output. Having each of the battery groupings in the MVCMs operate at a lower voltage decreases the risk of dangerous explosions, fires, etc. if any of these components fails. This design is different from conventional systems in which different battery cells are stacked together to increase voltage output and are not configurable. Typically, once stacked and connected, these conventional systems cannot be modified and form the high voltage battery pack that cannot have its output adjusted.

In aspects, an MVCM can include at least: a plurality of burst discs; a top cover coupled to the plurality of burst discs; a plurality of flame arrestors coupled to the top cover; a cell retention tray coupled to a main housing for retaining a plurality of battery cells; the plurality of battery cells; a plurality of conducting nails coupled to the plurality of battery cells and a printed circuit board; a plurality of battery cell isolation sleeves configured to isolate each of the plurality of battery cells; the main housing coupled to the top cover and configured to hold the plurality of battery cell isolation sleeves; a plurality of conducting springs coupled to a bottom of the main housing; the printed circuit board coupled to the plurality of conducting springs; a plurality of output terminals coupled to the printed circuit board, wherein the plurality of output terminals are configured to deliver output voltage generated by the plurality of battery cells to a multi-voltage configurable backplane (MVCB); and a bottom cover coupled to the main housing.

In aspects, an MVCB can include at least: a top cover coupled to a main housing; a main bus bar coupled to a plurality of circuit boards configured to store electronic components for controlling the energy output of a plurality of multi-voltage configurable modules (MVCMs); a plurality of configuration jumpers coupled to the plurality of printed circuit boards and further coupled to a plurality of output terminals of MVCMs, wherein the plurality of configuration jumpers receive output voltage generated by a plurality of battery cells of the MVCM; the plurality of isolation trays coupled to the plurality of configuration jumpers; and the main housing coupled to the plurality of isolation trays to provide mechanical retention for the MVCM.

In aspects, a method of manufacture of the MVCM can include at least the steps of: attaching a plurality of burst discs with a top cover; attaching a plurality of flame arrestors to a bottom portion of the top cover; placing a plurality of battery cell isolation sleeves within a body of a main housing; placing a plurality of battery cells within a cavity of the plurality of battery cell isolation sleeves; placing a cell retention tray in between the bottom portion of the top cover and a top portion of a main housing to enclose the plurality of battery cells; attaching the bottom portion of the top cover to the top portion of the main housing; attaching a plurality of conducting springs to a bottom portion of the main housing; attaching a printed circuit board to the plurality of conducting springs, wherein the printed circuit board comprises a plurality of output terminals integrated thereon; and attaching a bottom cover to the bottom portion of the main housing to enclose the printed circuit board.

In aspects, a method of manufacture of the MVCB can include at least the steps of: attaching a plurality of isolation trays to a main housing; attaching a plurality of configuration jumpers to the plurality of isolation trays; attaching a plurality of printed circuit boards to the plurality of isolation trays; attaching a main bus bar to the plurality of printed circuit boards; attaching a top portion of the main housing to a bottom portion of a top cover to enclose the plurality of isolation trays, the plurality of configuration jumpers, the plurality of printed circuit boards, and the main bus bar.

In aspects, a method, system, and/or a non-transitory computer readable medium storing instructions for performing operations for performing dynamic energy control of MVCMs and MVCB can be implemented. The method, system, and/or non-transitory computer readable medium for performing dynamic energy control can be implemented when the MVCB and MVCMs are connected to a device. The device can be one of a vehicle (a car, a truck, an airplane, a boat, etc.), or part of a device that serves as a wall or part of a wall for a house that uses the system for a home energy storage application, or any other large grid-tie system application. In aspects, the method, system, and/or non-transitory computer readable medium can include receiving, from a device, energy requirement information; receiving, from one or more multi-voltage configurable modules (MVCMs), information indicating an energy state of each of the MVCMs; determining how many MVCMs are available to deliver energy to the device based on the energy requirement information and the information indicating the energy state of each of the MVCMs; switching to an online state each of the MVCMs available to deliver energy to the device; monitoring each of the MVCMs and the energy requirement information to determine any changes in the energy requirement information or the information indicating the energy state of each of the MVCMs; and if any changes in the energy requirement information or the information indicating the energy state of each of the MVCMs are detected, determining whether any of the MVCMs should be disconnected or connected to meet energy requirements of the device.

In aspects, the information indicating the energy state of each of the MVCMs includes: a cell voltage, a cell temperature, and a cell identification. In aspects, the energy requirement information includes a system range calculation indicating the energy requirements (power and capacity requirements) of the device over a period of time or a distance. In aspects, the method, system, and/or non-transitory computer readable medium further comprises balancing voltage of the MVCMs in the online state based on an energy output of the MVCMs. In aspects, the method, system, and/or non-transitory computer readable medium further comprises transmitting, to the device, the information indicating the energy state of each of the MVCMs.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of the disclosure. However, it will be apparent that the disclosure may be practiced without these specific details. In order to avoid obscuring aspects of the present disclosure, some configurations and process steps are not disclosed in detail.

The drawings showing aspects of the system and its components are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

Multi-Voltage Configurable Module (MVCM)

FIG. 1 shows a MVCM 100 according to aspects of the disclosure. The MVCM 100 forms the energy block of the battery system and contains battery cells in addition to other components. The components of the MVCM 100 will be discussed in further detail with respect to FIG. 2.

The MVCM 100 can be implemented in a number of different shapes. In aspects, and as shown in FIG. 1, the MVCM 100 can be shaped as a rectangular cuboid. In aspects, an outer body of the MVCM 100 can form an enclosure, enclosing the components of the MVCM 100. In aspects, the rectangular cuboid can have a length "L", a width "W", and a height "H." In aspects, the length, width, and height can be varied depending on the number of battery cells installed in the MVCM 100 and the form factor of the cells.

In aspects, the outer body of the MVCM 100 can comprise a plurality of burst discs 106, a top cover 102, a main housing 104, and a bottom cover 110, which are all coupled together to enclose the components of the MVCM 100. In aspects, the burst discs 106 can be attached to and/or embedded in the top cover 102. The burst discs 106 provide a pressure safety mechanism that protects the MVCM 100 from over pressurization or potentially damaging vacuum conditions. The position and function of the burst discs 106 are also to provide a controlled path for hot gases in the case of a cell thermal runaway. In aspects, the top cover 102 can be coupled to the main housing 104. The coupling can be done mechanically using screws or pins that are inserted into screw holes 108, which screw or pin the top cover 102 to the main housing 104. In aspects, the screws or pins can be removed so that the top cover 102 can be detached from the main housing 104. As a result, the MVCM 100 can be easily taken apart so that the internal components of the MVCM 100 can be accessed. The bottom cover 110 can be coupled to the main housing 104. The coupling can be done mechanically using similar screws or pins, and in the same manner that the top cover 102 is coupled to the main housing 104. In aspects, the screws and pins can be removed so that the MVCM 100 internal components can be accessed.

Figure 2:
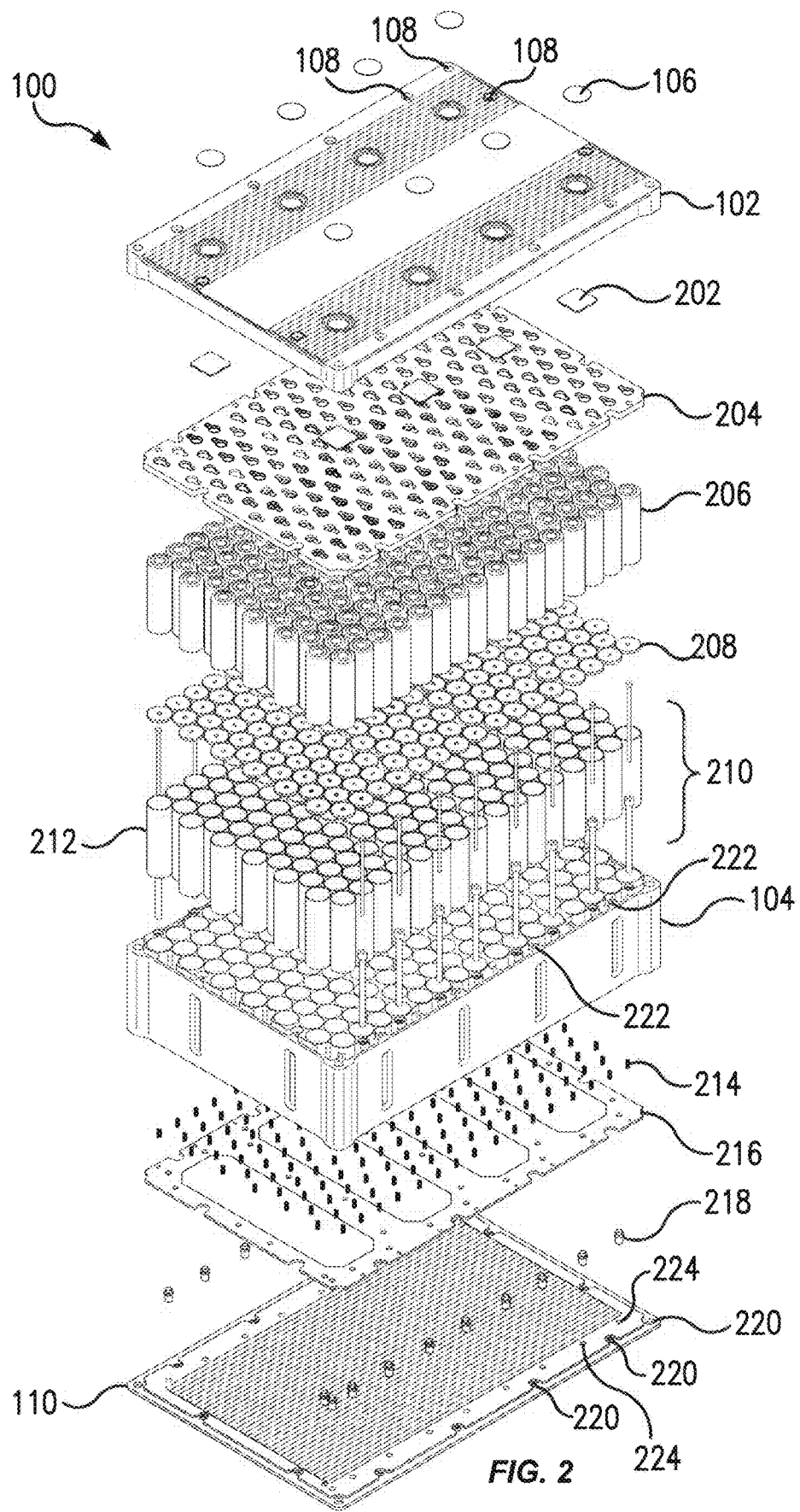
FIG. 2 shows the components of the MVCM according to aspects of the disclosure.

FIG. 2 shows the components of the MVCM 100 according to aspects of the disclosure. The components can include at least: the burst discs 106, the top cover 102, a plurality of flame arrestors 202, a cell retention tray 204, a plurality of battery cells 206, a plurality of battery cell isolators 208, a plurality of cell isolation sleeves 212, a plurality of conducting nails 210, the main housing 104, a plurality of conducting springs 214, a printed circuit board 216, a plurality of output terminals 218, and the bottom cover 110.

Figure 3:
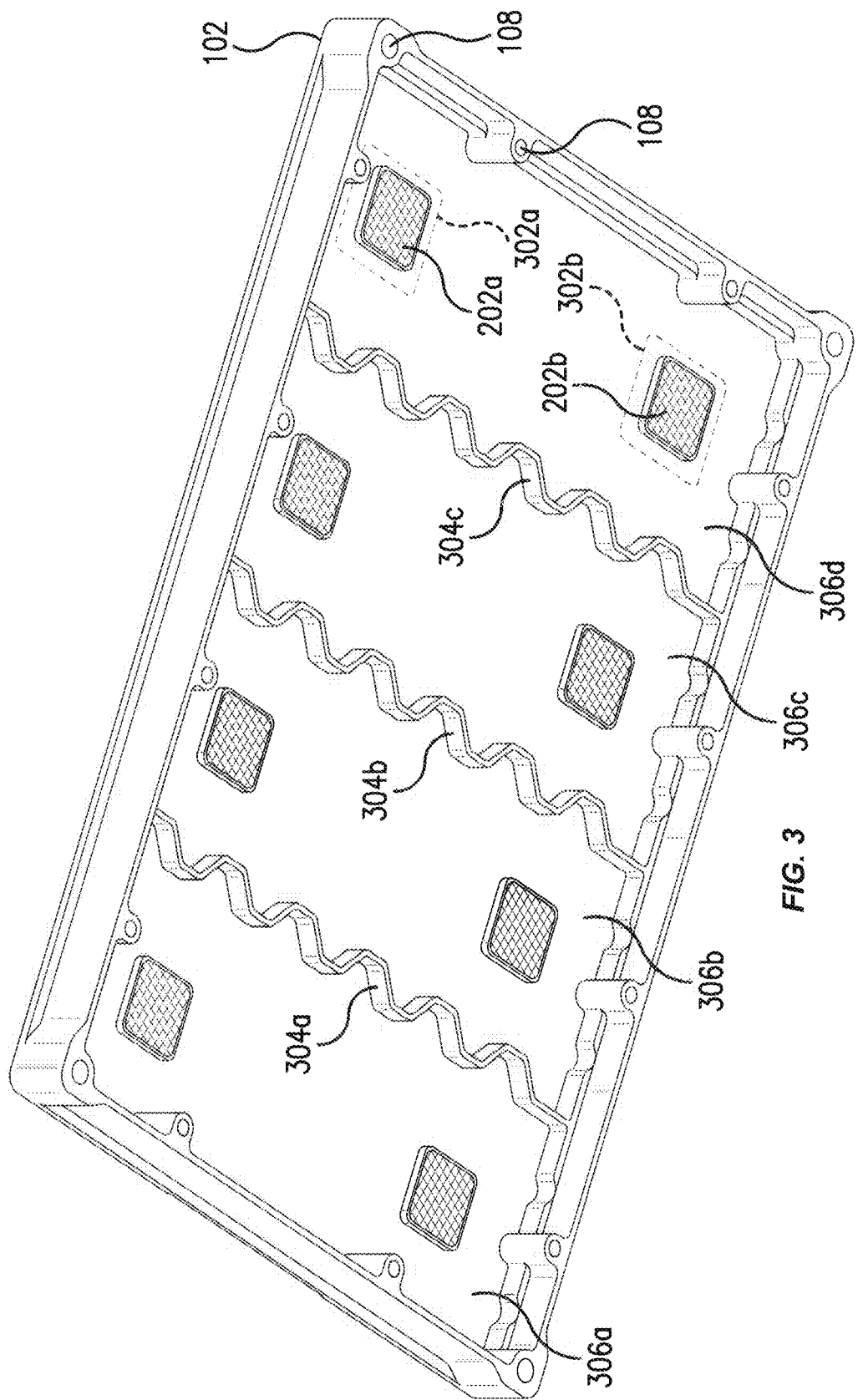
FIG. 3 shows a bottom view of the top cover of the MVCM according to aspects of the disclosure.

In aspects, the flame arrestors 202 can couple to the bottom of the top cover 102. In aspects, the flame arrestors 202 can couple to the top cover 102 by being inserted into a cavity or space in the bottom portion of the top cover 102. Such coupling is shown in FIG. 3, where a flame arrestor is shown inserted or attached to cavity 302. The flame arrestors 202 function to prevent a flame from spreading in the event of an explosion of any of the battery cells 206 or an electrical fire within the MVCM 100.

In aspects, the cell retention tray 204 can be placed in between the top cover 102 and the main housing 104. In aspects, the cell retention tray 204 can be made as a single structure comprised of an electrically isolating material. In aspects, the cell retention tray 204 can couple to the main housing 104. The coupling can be via screws or pins that can be inserted into further screw holes 222 of the main housing 104 and attach the cell retention tray 204 to the main housing 104. In aspects, rather than coupling via screws or pins, the cell retention tray 204 can be held in place by the top cover 102 itself. This allows for easy disassembly in the case of refurbishing the MVCM 100. In aspects, the cell retention tray 204 can provide mechanical retention for the battery cells 206 to hold the battery cells 206 in a fixed location so they do not become dislodged from their positions within the main housing 104. In aspects, the cell retention tray 204 can also provide electrical isolation of the battery cells 206 from the main housing 104 to prevent any short circuits or undesired electrical connections to form that may result between the battery cells 206 and the main housing 104.

The design of the cell retention tray 204 provides an improvement over conventional retention mechanisms used to retain batteries. This is for two reasons. First, due to being a single structure, the cost of manufacturing the cell retention tray 204 is reduced over conventional battery retention mechanisms. In conventional systems, battery retention mechanisms are implemented such that only a subset of batteries or each individual battery is retained by an apparatus or retention mechanism. This results in multiple cell retention apparatuses that are used. The streamlining and utilization of one cell retention tray 204 is cheaper than the fabrication and integration of multiple cell retention apparatuses. The cell retention tray 204 also provides an improvement over conventional cell retention mechanisms because it can be detached from the main housing 104. The ability to remove the cell retention tray 204 by unscrewing or removing the screws or pins used to couple the cell retention tray 204 to the main housing 104, or by simply removing the top cover 102 and removing the cell retention tray 204, allows for the swapping out of any of the battery cells 206. This feature is not found in conventional battery modules because conventional battery modules are sealed so that the internal components cannot be accessed easily.

In aspects, the battery cells 206 can be placed in the main housing 104. The battery cells 206 can comprise different battery chemistries so long as they are configured to operate within the same range of voltages. In aspects, the battery cells 206 can be different for any particular MVCM 100. Thus, each MVCM 100 can have a different type of battery contained therein. In aspects, different MVCMs can be combined to allow for a hybrid battery system in which several different battery types are used in conjunction, to provide power to the overall battery system. This feature is unique to the system because conventional systems typically do not allow for hybrid chemistries to be used. They typically use one battery type that must be the exact same throughout the system. In aspects, the ability to use hybrid chemistries allows for expanded power/capacity options that the battery system can provide. This feature also allows for flexibility in replacing MVCMs when any MVCM 100 fails because any number of cell types can be used to replace a malfunctioning or damaged MVCM 100.

In aspects, the battery cells 206 can be wire bonded to one another using a continuous wire thread connecting a segmented group of battery cells. The continuous wire thread can form a cell bus bar through which current can flow for a segmented group of battery cells. In aspects, each segmented group of battery cells can be wire bonded to form a 48V section of the MVCM 100. In aspects, the MVCM 100 can be arranged such that the battery cells 206 form eight individual 48V sections. In aspects, these eight individual 48V sections can be mechanically isolated and physically split up into four sections. The sections are shown more clearly in FIG. 3 as elements 306a, 306b, 306c, and 306d, each of which can contain two 48V sections. Depending on the configuration of the MVCM 100, the MVCM 100 can have more or less than eight individual 48V sections. For example, in aspects, 16 individual 48V sections can be installed in each MVCM 100.

In aspects, the material used for the wire bonding can be any electrically conductive material that can be threaded and strung into a wire. In aspects, the threaded and bonded wire can be structurally supported by the cell retention tray 204. In aspects, the wire can be threaded on top of the cell retention tray 204 and form a bus along which current can travel from a cathode portion of the battery cells 206 to an anode section of the conducting nails 210. Having the battery cells 206 connected in this way provides a novel architecture over conventional systems because in typical battery systems, battery cells are individually bonded to a collector bus bar. These point to point connections are different from the disclosed system where a single string connects cathode sections of segmented groups of battery cells which then connect to the conducting nails 210 (the conducting nails 210 acting as the "bus bar"). The disclosed connection is a more efficient way to connect cells together because individual bonds do not have to be made for each component.

In aspects, the conducting nails 210 can provide electrical connections from the battery cells 206 to the printed circuit board 216. The conducting nails 210 allow for current provided by the segmented groups of battery cells to flow through the conducting nails 210 to the printed circuit board 216. The conducting nails 210 can allow for a design of the MVCM 100 in which a single printed circuit board 216 containing electronic components that can be used to sense and balance the voltages provided by the battery cells 206 can be placed at a bottom portion of the main housing 104. Because the conducting nails 210 can channel the current towards the bottom portion of the MVCM 100, the printed circuit board 216 can be placed at the bottom of the main housing 104. Having the printed circuit board 216 located at the bottom of the main housing 104 results in increased safety for the MVCM 100, because the printed circuit board 216 is not in the path of gases if any of the battery cells 206 vent. This design also allows for all the cells to be oriented the same way and utilize single side wire bonding (on the cathode end of the cells) while keeping the circuit board away in case of any cell vent. Additionally, absent the use of the conducting nails 210, separate printed circuit boards would have to be used on the cathode side. Thus, use of a single printed circuit board 216 also reduces the costs of manufacturing the MVCM 100 because less printed circuit boards have to be manufactured and assembled for each MVCM 100.

In aspects, the battery cells 206 can be placed in cavities of a plurality of battery cell isolation sleeves 212. The battery cell isolation sleeves 212 can be located within a body of the main housing 104. In aspects, each of the battery cells 206 can be placed in an individual isolation sleeve. In aspects, the battery cell isolation sleeves 212 can have a geometric shape forming a cylindrical cavity in which each of the battery cells 206 is placed. Other shapes can also be used depending on the shape of the battery cells 206. The battery cell isolation sleeves 212 can isolate each of the battery cells 206 from one another and from other components of the MVCM 100. Thus, the battery cell isolation sleeves 212 can form a barrier around each of the battery cells 206 to keep each battery cell separate and in place. The battery cell isolation sleeves 212 can work in conjunction with the cell retention tray 204, which forms a cover over each of the battery cells 206, to enclose each of the battery cells 206. In aspects, a plurality of battery cell isolators 208 can be placed at a bottom portion of the battery cell isolation sleeves 212 to provide further isolation of each of the battery cells 206. In aspects, the battery cell isolators 208 can contain a conductive portion that can couple to a plurality of conducting springs 214. In this way, the conducting springs 214 can sense voltages of the battery cells 206 and enable cell voltage sensing and balancing between the printed circuit board 216 and the bottom of each of the battery cells 206.

In aspects, the printed circuit board 216 can be coupled to the bottom of the main housing 104. In aspects, the bottom of the main housing 104 can have a plurality of conducting springs 214 coupled to it, and which also couple to the printed circuit board 216. The conducting springs 214 can be made out of any material that is electrically conductive. The conducting springs 214 can be used for cell voltage sensing and balancing. In aspects, the printed circuit board 216 can contain components to measure each individual cell's voltage and components that can actively be switched "on" to allow for cell to cell balancing.

In aspects, the conducting springs 214 can be installed and disassembled in case of cell removal. The ability of the conducting springs 214 to be installed and disassembled is an improvement over conventional systems because typically voltage sensing is performed using a welded wire or bus bar connection that is permanent. In aspects, the conducting springs 214 also provide the benefit of added redundancy for voltage sensing and balancing. This is because in the case where two cells are in parallel, individual conducting springs can be used to sense voltage in each, which can be compared to determine if the sensed voltages match and/or if there are any differences between the two. Any differences can trigger a balancing to be performed.

In aspects, the printed circuit board 216 can also have a plurality of output terminals 218 coupled to its bottom portion. The output terminals 218 can be configured to deliver the output voltages generated by the battery cells 206 to a multi-voltage configurable backplane (MVCB). The output terminals 218 can couple to the MVCB by attaching or plugging into terminals of the MVCB to deliver the output voltages. How the MVCB attaches to the output terminals 218 will be discussed further below. The coupling of the output terminals 218 to the bottom portion of the printed circuit board 216 can be more clearly seen in FIG. 4, which shows the output terminals 218 coupled to the bottom of the printed circuit board 216.

In aspects, the printed circuit board 216 can be designed to have sixteen output terminals 218. Thus, there can be two output terminals 218 per each of the eight individual 48V sections.

In aspects, the bottom cover 110 can couple to the main housing 104 to enclose the printed circuit board 216. The coupling can be via screws or pins that are inserted into a third set of screw holes 220, that screw or pin the bottom cover 110 to the main housing 104. In aspects, the bottom cover 110 can have a plurality of output holes 224 from which the output terminals 218 are accessible for a mating pin. The MVCB configuration jumpers 606, which will be described with respect to FIG. 6, become the mating pin for the MVCM output terminals 218 and allow the output terminals 218 to be able to attach to the MVCB.

FIG. 3 shows a bottom view of the top cover 102 of the MVCM 100 according to aspects of the disclosure. FIG. 3 shows a configuration for the inside of the top cover 102 as it is viewed from the bottom. In aspects, the inside can be partitioned physically into four isolated sections, each labeled 306a, 306b, 306c, and 306d. Each of these sections can be separated mechanically by dividers labeled 304a, 304b, and 304c. Each of the four sections can have two of the 48V sections of the battery cells 206 contained within the section. Each of the four sections can also have two flame arrestors (e.g., 202a and 202b), one for each of the 48V sections. FIG. 3 shows eight flame arrestors 202, each of which is inserted or attached to a cavity 302a and 302b.

The design of the top cover 102, as shown in FIG. 3 has several benefits. First, each of the four isolated sections provide a physical barrier to protect against thermal runaway in the event that any of the battery cells 206 overheat. Thus, the effect of any overheating in one of the sections on the other sections can be minimized via the barrier. This adds to the safety features of the MVCM 100. Second, the top cover 102 is designed to aid in the fixing of the cell retention tray 204. The dividers 304a, 304b, and 304c can press down onto the cell retention tray 204 to secure it in place. Third, two flame arrestors 202 for each of the four sections provides redundancy. Thus, in the case that one of the flame arrestors 202 fails, there is a second one to function in its place.

Figure 4:
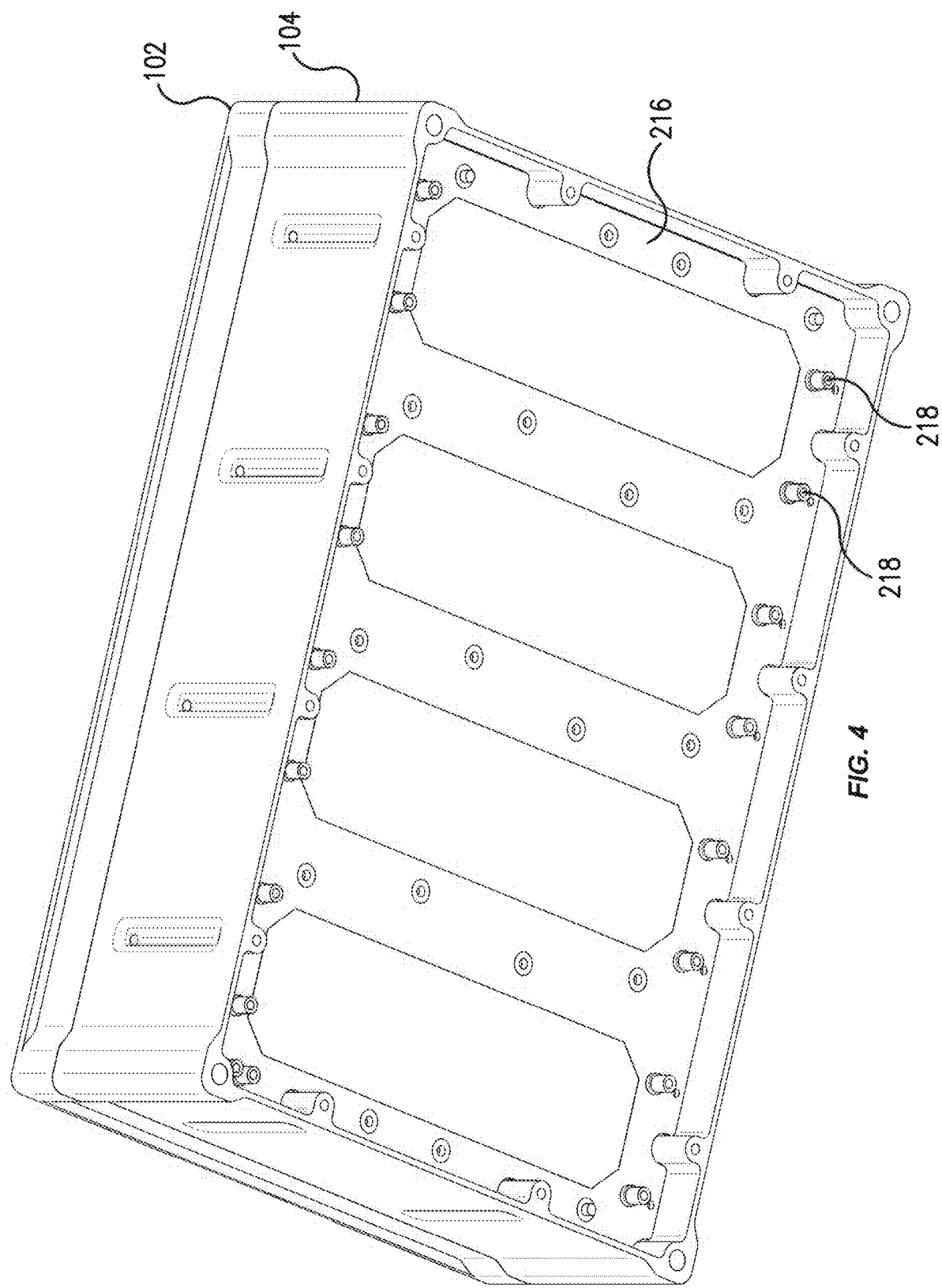
FIG. 4 shows a bottom view of the MVCM according to aspects of the disclosure.

FIG. 4 shows a bottom view of the MVCM 100 according to aspects of the disclosure. FIG. 4 shows the MVCM 100 without the bottom cover 110 attached. The printed circuit board 216 is shown being coupled to the main housing 104. As shown in FIG. 4, the printed circuit board 216 can be inserted into a cavity on the bottom of the main housing 104. FIG. 4 also shows the output terminals 218 that are coupled to the printed circuit board 216.

Multi-Voltage Configurable Backplane (MVCB)

Figure 5:
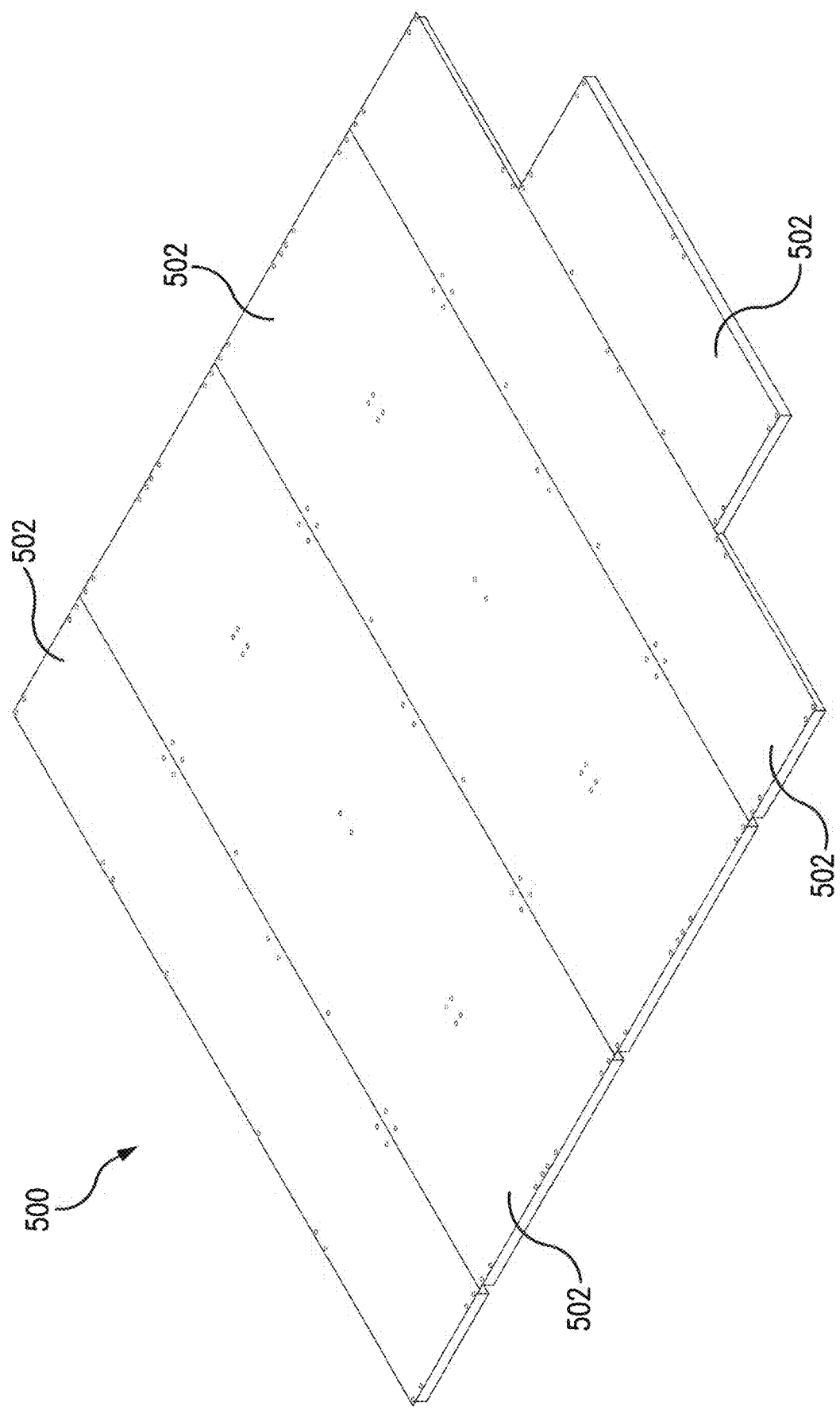
FIG. 5 shows a view of a multi-voltage configurable backplane (MVCB) according to aspects of the disclosure.

FIG. 5 shows a view of a MVCB 500 according to aspects of the disclosure. The MVCB 500 is the mechanical and electrical interface to the MVCMs. In aspects, the MVCB 500 includes the power electronics and logic to allow a dynamic configuration of the MVCMs. In aspects, the MVCB 500 can have one or more MVCMs plugged into it to deliver power to a device structure. In aspects, the device structure can be an appliance, home energy storage system, an EV, an airplane, or a large grid-tie system (e.g., solar panels), etc. The MVCB 500 can also provide the structural support for the device structure. For example, if the device structure is an EV, the MVCB 500 can form a part of the EV's body, for example, the underside of the EV, or can attach to the EV's vehicle bed to provide structural support for the vehicle.

The MVCB 500 can be configurable and be assembled to take a variety of shapes. For example, and as shown in FIG. 5, MVCB 500 can be shaped substantially as a rectangle or square. In aspects, the MVCB 500 can comprise different panels 502 that can be coupled together to give the MVCB 500 its shape. In aspects, the coupling can use screws, clips, or slideable grooves in which each of the panels 502 can be slideably inserted to join with other panels 502. Due to its configurability, the shape of the MVCB 500 can dictate the system's capacity to store energy because depending on its shape, different numbers of MVCMs can be coupled to the MVCB 500, thus changing how much energy/capacity can be stored by the system.

Figure 6:
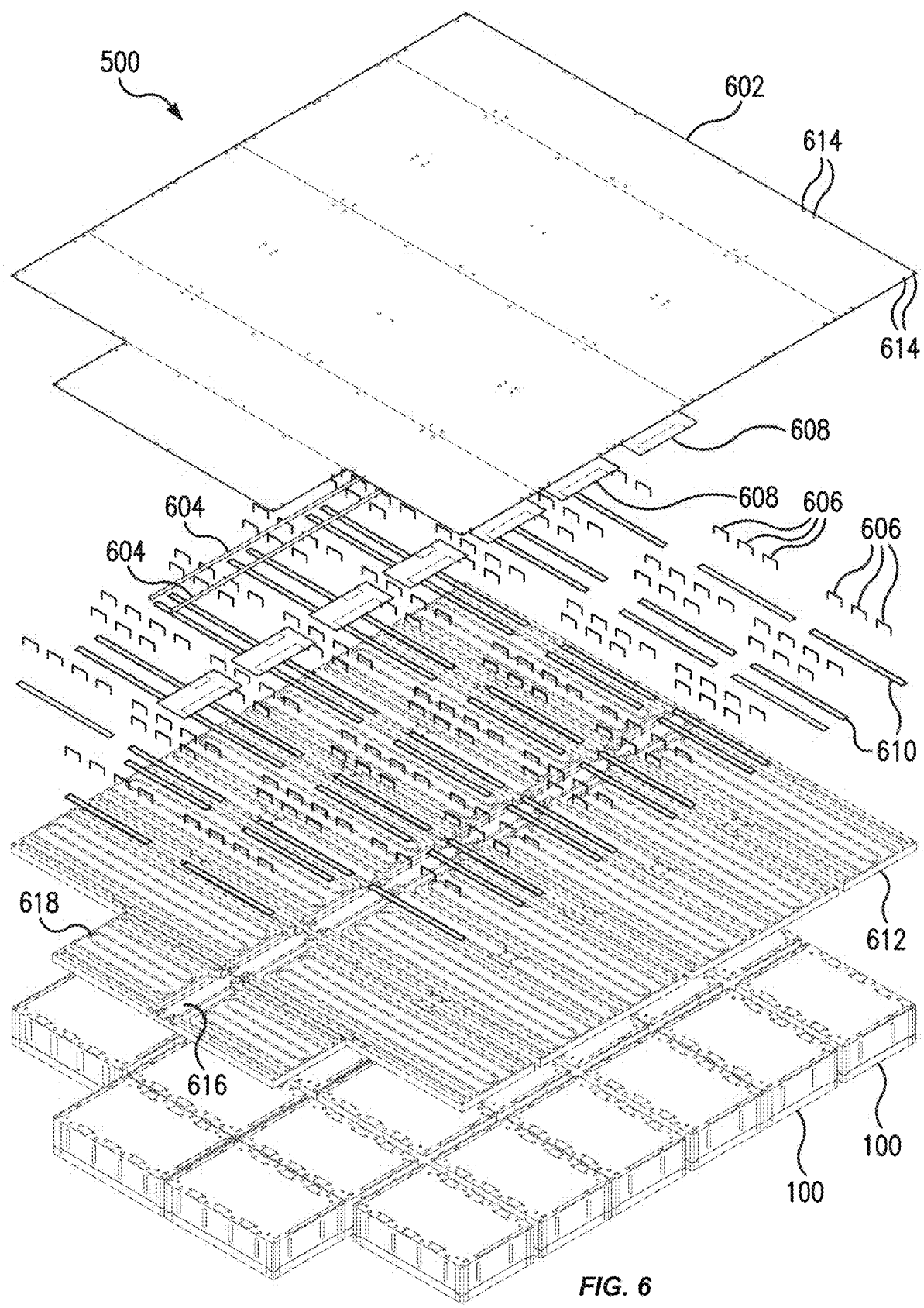
FIG. 6 shows the components of the MVCB according to aspects of the disclosure.

FIG. 6 shows the components of the MVCB 500 according to aspects of the disclosure. In aspects, components can include a top cover 602, a plurality of printed circuit boards 608, a main bus bar 604, a plurality of configuration jumpers 606, a plurality of isolation trays 610, and a main housing 612.

In aspects, the top cover 602 can provide the external shell for the MVCB 500. In aspects, the top cover 602 can couple to the main housing 612 to enclose the other components of the MVCB 500. In aspects, the coupling can be done mechanically using screws or pins that are inserted into backplane screw holes 614, which screw or pin the top cover 602 to the main housing 612. In aspects, any material that meets the mechanical function of sealing the MVCB 500 is allowable.

In aspects, the printed circuit boards 608 can be contained between the top cover 602 and the main housing 612. In aspects, the printed circuit boards 608 can couple to the main housing 612 to fix the printed circuit boards 608 in place within the MVCB 500. In aspects, the printed circuit boards 608 can contain the electronic circuitry and active switches to monitor the MVCMs, and connect/disconnect MVCMs to the overall system. In aspects, the electronic circuitry can control the energy output of the system by controlling which of the MVCMs come on or offline. In this way, the printed circuit boards 608 provide the control electronics of the battery system. In aspects, each of the printed circuit boards 608 can control any number of MVCMs. For example, four or more MVCMs can be controlled by any one of the printed circuit boards 608. In aspects, the printed circuit boards 608 can be configured to dynamically control the MVCMs by recognizing when any MVCM 100 is connected or disconnected from the MVCB 500, and adjust and/or balance the voltages of the system accordingly, so that the operation of the system as a whole does not cease. Thus, the printed circuit boards 608 can adjust the system's capacity/power as required. The benefits of partitioning the printed circuit boards 608 are to be able to control a subset of MVCMs and be able to dynamically control the MVCMs in the occurrence of individual cell failure/degradation or if any MVCM 100 is damaged. In that case, the individual MVCM 100 or the group of MVCMs can be electrically disconnected without shutting down the entire system if there are other MVCMs that can deliver energy for the system. This allows for continued operation, which is both a safety benefit and a reliability feature that conventional battery systems lack.

In aspects, the printed circuit boards 608 can be coupled to the main bus bar 604. The main bus bar 604 acts as a current collector for current flowing into the printed circuit boards 608 from the MVCMs. The main bus bar 604 provides an electronic bus on which current can be distributed from different MVCMs throughout the system. The main bus bar 604 can be manufactured using any electrically conductive material.

In aspects, the system can also have a secondary bus. The secondary bus can be similar to the main bus bar 604 and can work in conjunction with the main bus bar 604. In aspects, the secondary bus can also be coupled to the printed circuit boards 608. In aspects, the secondary bus can be used to form a second lower voltage network for balancing MVCMs and powering auxiliary lower power components. The lower voltage is in reference to the voltages that are delivered via the network formed by the main bus bar 604. For example, in an EV, the secondary bus can be used to balance and deliver power to devices such as air-conditioning compressors, power steering pumps, DC/DC converters, DC/AC inverters, etc., while the main bus bar 604 can be used to power the engine, lights, etc.

In aspects, the electronic circuitry on the printed circuit boards 608 can be used to allocate power between the main bus bar 604 and the secondary bus. In aspects, electronic circuitry can be configured and programmed to adjust how much voltage can be delivered by the secondary bus. In aspects, the system can be configured to have the secondary bus deliver voltages at 12V, 24V, 48V, or 350V to auxiliary devices.

In aspects, the main bus bar 604 and the secondary bus can be located along a spine 616 of the MVCB 500. The spine 616 refers to a strip or section of the MVCB 500 that runs substantially straight through the middle portion of the MVCB 500. In aspects, the printed circuit boards 608 can also be located along the spine 616 of the MVCB 500. Having the main bus bar 604, the secondary bus, and the printed circuit boards 608 located along the spine 616 provides safety benefits. For example, in the case where the system is used in an EV, design of the spine 616 in this way provides increased protection in the event of physical damage to the vehicle structure, because the spine 616 is typically the furthest point from any impact the EV may suffer from being struck from the sides or back if the EV gets hit by other objects.

In aspects, the configuration jumpers 606 can be coupled to the printed circuit boards 608 and further coupled to the output terminals 218 of the MVCMs. The configuration jumpers 606 make the electrical connections between MVCM's 48V sections (either series or parallel) and to the printed circuit boards 608 of the MVCB 500. In aspects, the configuration jumpers 606 can be configured to connect the 48V sections of the MVCMs in a series/parallel arrangement to create the system level voltage needed for the application of the MVCMs to the printed circuit boards 608 of the MVCB 500. In aspects, the configuration jumpers 606 can be configured to connect the 48V sections of the MVCMs to a printed circuit board from the printed circuit boards 608. The configuration jumpers 606 can be made of any electrically conducting material that can be formed into a wire or rod shape. In aspects, configuration jumpers 606 can be placed within the MVCB 500 according to a standardized spacing to align with the output terminal 218 of the MVCMs so the configuration jumpers 606 can couple to the output terminals 218 of FIG. 2.

In aspects, the configuration jumpers 606 can be part of a circuitry that contains switches/active components that can control the electrical connections between the MVCMs to the printed circuit boards 608. The benefit of having this design is that each of the connections can be controlled individually using the switches, which would allow disconnection of each section leaving the entire system at 48V when the system is not powered on. This provides benefits of maintaining components at low voltage, which increases the safety of the system. Conventional systems, once connected and powered on cannot be configurable to reduce the voltage of the entire system in this manner.

In aspects, the configuration jumpers 606 can be coupled to the isolation trays 610. In aspects, the configuration jumpers 606 can be placed inside the isolation trays 610. The isolation trays 610 refer to strips on which the configuration jumpers 606 can be installed and removed from while maintaining electrical isolation from the main housing 612 of the MVCB 500. Thus, the isolation trays 610 make it easy to remove or install the configuration jumpers 606 and further add to the configurability of the system, because configuration jumpers 606 can be added or removed to further customize the electrical output of the system, by adding and removing electrical connections to the printed circuit boards 608 and the buses of the system. In aspects, the isolation trays 610 can be coupled to the main housing 612 of the MVCB 500. The coupling can be via screws or pins similar to what was described previously with respect to the other screw or pin mechanisms holding other components of the MVCM 100 or MVCB 500 together.

In aspects, the main housing 612 can form a bottom section of the MVCB 500. In aspects, the main housing 612 can provide mechanical retention for the MVCMs and is the interface onto which the MVCMs couple to the MVCB 500. In aspects, the configuration jumpers 606 can protrude out of the main housing 612 in order to couple to the output terminals 218 of the MVCMs. In aspects, the main housing 612 can have integrated cooling provisions for the MVCMs. The integrated cooling provisions can take the form of grooves/channels 618 formed on a surface of the main housing 612, which maximize the surface area of the main housing 612 and provide a channel for heat generated by the MVCMs to channel through to the exterior of the MVCB 500.

In aspects, the main housing 612 can also provide structural support for any device structure on which the MVCB 500 is installed or integrated with. For example, the main housing 612 can serve as the close out for a vehicle floor/sides (e.g., a truck bed, the underside of a vehicle, etc.) and provide vehicle structural support. Similarly, the main housing 612 can provide structural support for an aircraft, shipping vessel, etc., or serve as a wall or part of a wall for a house that uses the system for a home energy storage application.

Figure 7:
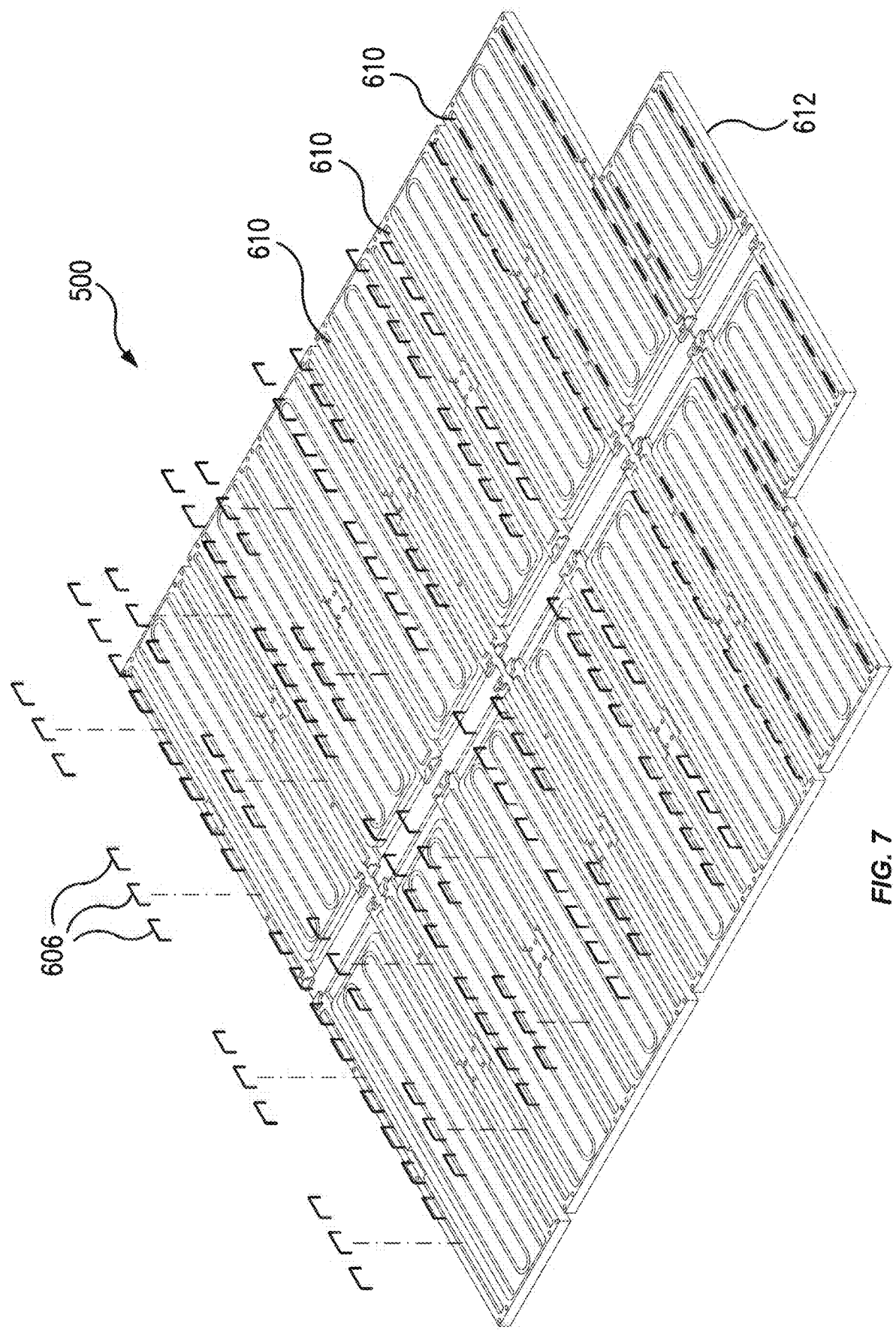
FIG. 7 shows how configuration jumpers of the MVCB are placed within the MVCB according to aspects of the disclosure.

FIG. 7 shows how configuration jumpers 606 of the MVCB 500 are placed within the MVCB 500 according to aspects of the disclosure. FIG. 7 shows how the configuration jumpers 606 are placed on the isolation trays 610 in a sequential manner.

Figure 8:
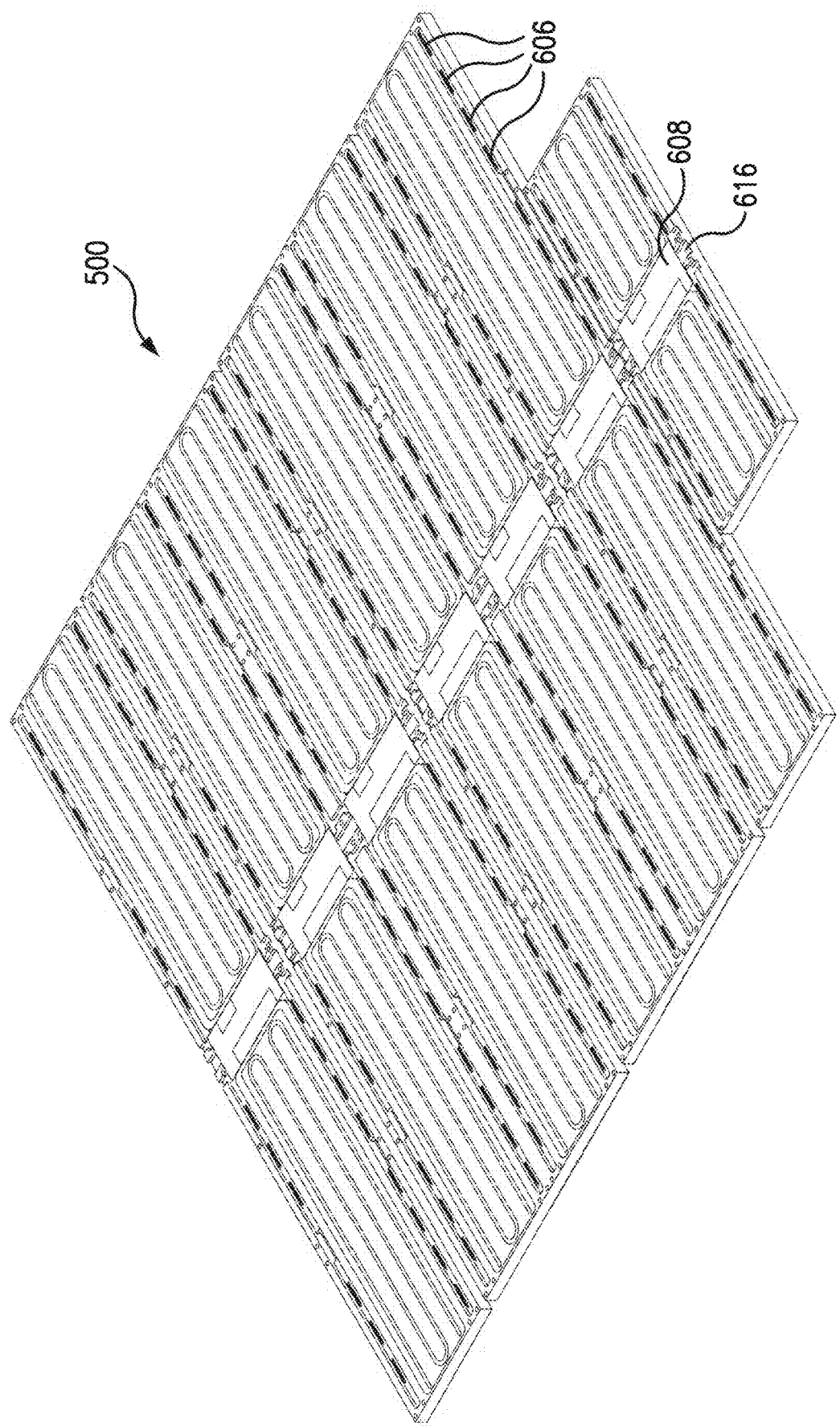
FIG. 8 shows the MVCB with configuration jumpers installed thereon, and printed circuit boards with electronic components installed along a spine of the MVCB according to aspects of the disclosure.

FIG. 8 shows the MVCB 500 with configuration jumpers 606 installed thereon, and printed circuit boards 608 with electronic components installed along the spine 616 of the MVCB 500 according to aspects of the disclosure.

Figure 9:
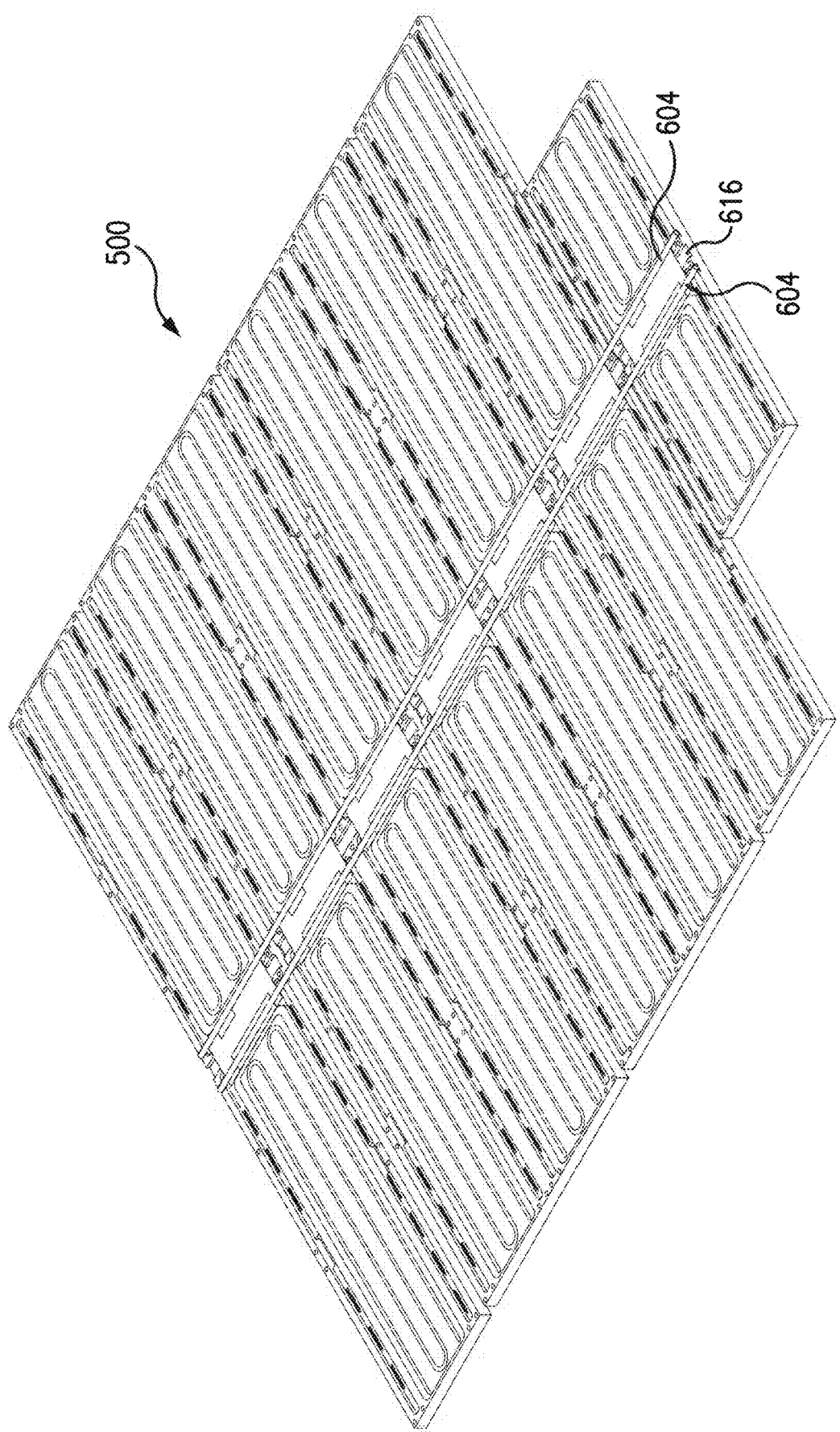
FIG. 9 shows the MVCB with main bus bars installed along the spine of the MVCB according to aspects of the disclosure.

FIG. 9 shows the MVCB 500 with main bus bars 604 installed along the spine 616 of the MVCB 500 according to aspects of the disclosure.

Figure 10:
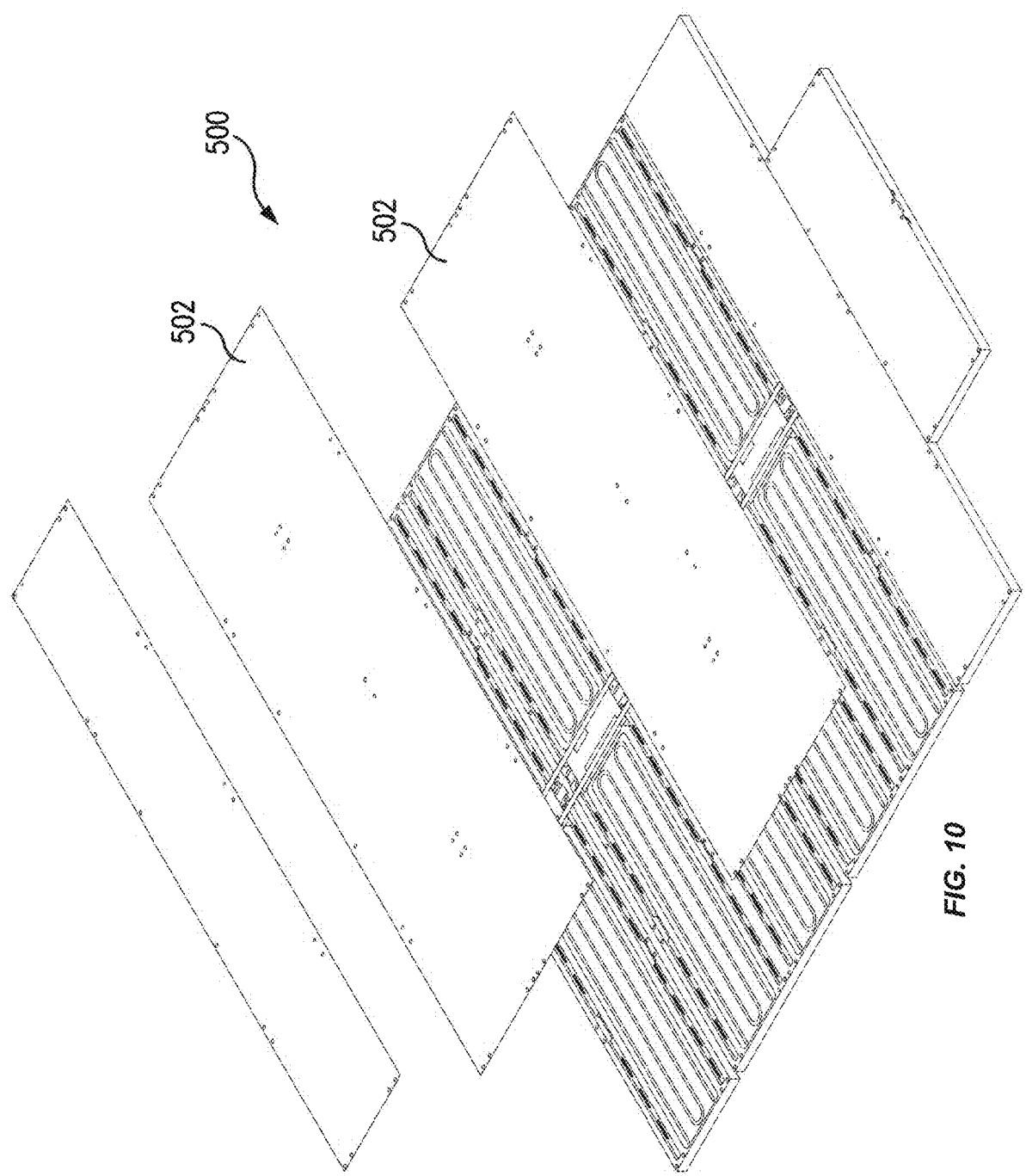
FIG. 10 shows how panels that form the top cover of the MVCB are placed to enclose the components of the MVCB according to aspects of the disclosure.

FIG. 10 shows how panels 502 that form the top cover 602 of the MVCB 500 are placed to enclose the components of the MVCB 500 according to aspects of the disclosure. In other aspects, rather than use multiple panels 502 to form the top cover 602, a single panel can be used to form the top cover. The single panel can be shaped in a variety of ways based on the configuration desired for the MVCB 500.

Figure 11:
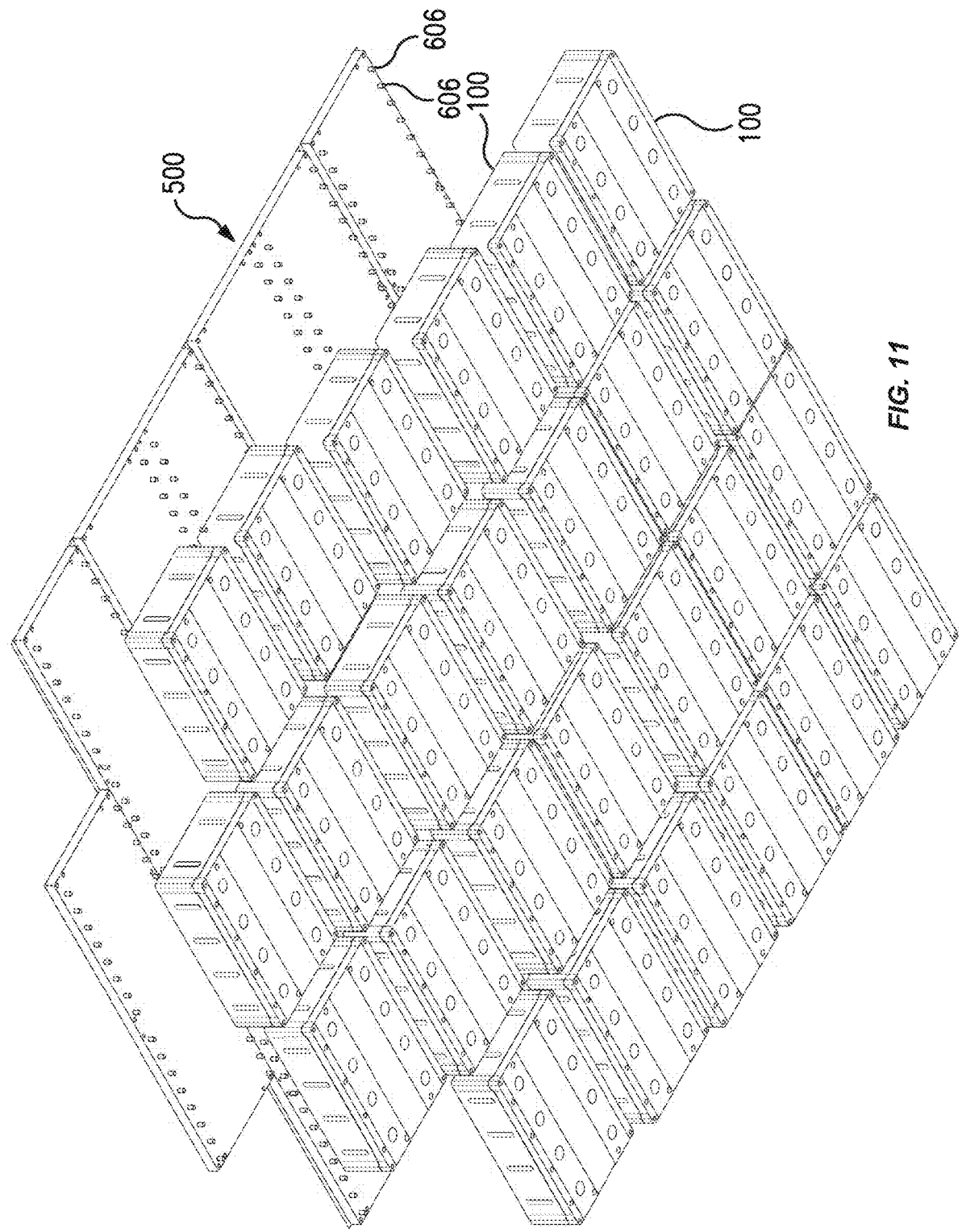
FIG. 11 shows how MVCMs are installed on the MVCB according to aspects of the disclosure.

FIG. 11 shows how MVCMs are installed on the MVCB 500 according to aspects of the disclosure. The MVCMs are shown attaching to the underside of the MVCB 500 and to the configuration jumpers 606. In this way, the MVCMs can deliver power to the MVCB 500.

Figure 12:
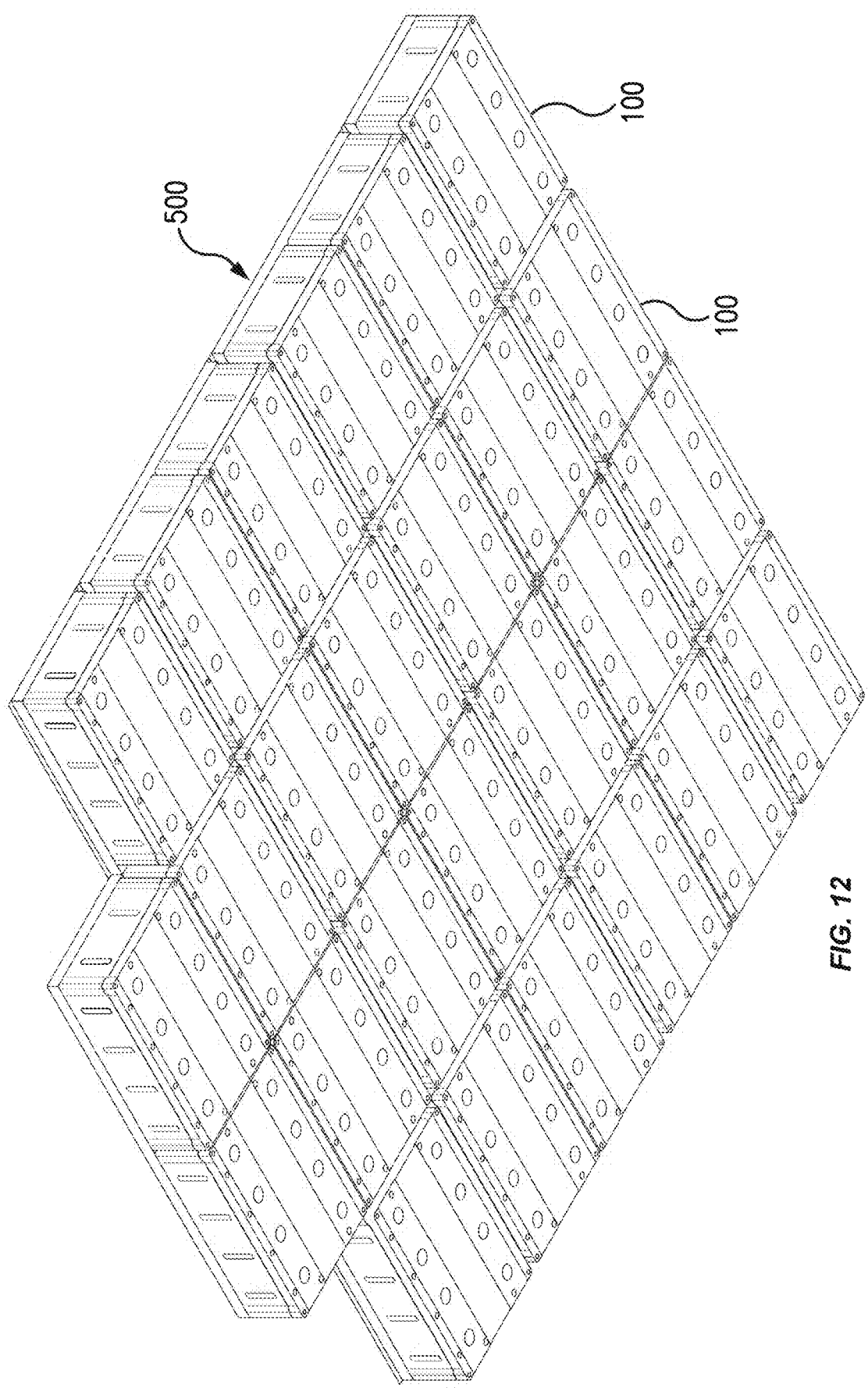
FIG. 12 shows the installed MVCMs on the MVCB according to aspects of the disclosure.

FIG. 12 shows the installed MVCMs on the MVCB 500 according to aspects of the disclosure.

Figure 13:
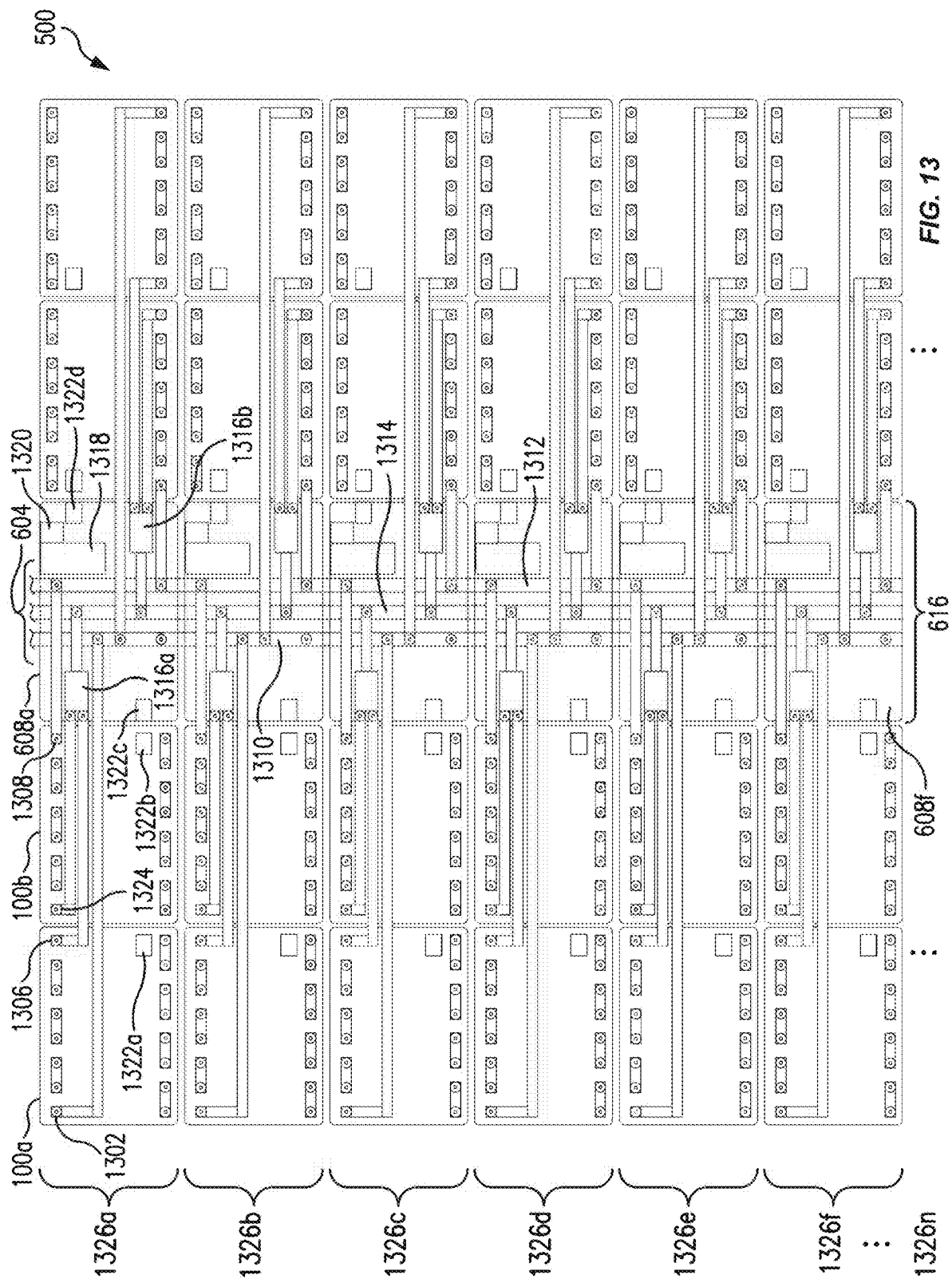
FIG. 13 shows the electrical connections of the MVCB according to aspects of the disclosure.

FIG. 13 shows the electrical connections of the MVCB 500 according to aspects of the disclosure. FIG. 13 shows the main bus bar 604 with two separate rails 1310 and 1312. Rail 1312 is the positive voltage rail of the main bus bar 604, and rail 1310 is the negative voltage rail of the main bus bar 604. Rails 1310 and 1312 form a high voltage network that allows the main bus bar 604 to deliver the high voltage to power various components of the system. In aspects, the voltage along the main bus bar 604 can be, for example, 750V in a typical EV application. This is exemplary. Depending on the application for the battery system, this voltage can be varied.

In aspects, the MVCB 500 can have a third rail 1314. The third rail 1314 can be the secondary bus. The third rail 1314 can form a lower voltage network for the system. In aspects, the lower voltage network can power auxiliary components that do not need the high voltages delivered by the main bus bar 604, as described with respect to FIG. 6. The lower voltage is in reference to the higher voltage formed by the main bus bar 604. For example, in a typical EV application, the voltage across the third rail 1314 can be 350V. This is exemplary. Depending on the application for the battery system, this voltage can be varied.

In aspects, and as shown in FIG. 13, rails 1310, 1312, and 1314 can connect to pairs of MVCMs. These pairs are shown in FIG. 13 as {1326a, 1326b, ... 1326n}. The number of pairs shown in FIG. 13 is merely exemplary. The system can have more or less pairs of MVCMs depending on the application in which the system is used. While the pairs are only labeled on the left side of the bus bar rails of FIG. 13, similar pairs are located on the right side of the bus bar rails of FIG. 13. The labeling on one side is for simplicity. The pairs on the right side of the bus bar rails have identical connections to the rails 1310, 1312, and 1314. They also contain identical components. Thus, when connections or components are described with respect to a pair of MVCMs (e.g., 1326a) they apply equally to all other MVCM pairs.

In aspects, through their connections to rails 1310, 1312, and 1314, the pairs of MVCMs can connect to the overall system via a parallel connection to deliver power throughout the system. This configuration has the benefit that if any pair of MVCMs is disconnected from the system, the other pairs of MVCMs can continue operation to deliver power to the system without interruption. Thus, connecting the system in this way adds redundancy and provides for system stability.

In aspects, the MVCMs can individually contain other components that can connect the MVCMs to various electronic components on printed circuit boards 608 located along the spine 616 of the MVCB 500. For example, MVCMs 100*a* and 100*b*, shown in FIG. 13, can have serial peripheral interface (IsoSpi) connectors 1322*a* and 1322*b*. These IsoSpi connectors can connect each of the MVCMs 100*a* and 100*b* to printed circuit board 608*a* to transfer information such as cell voltage measurements, temperatures, etc. obtained from sensors installed on the MVCMs 100*a* and 100*b* to components of the printed circuit board 608*a*, for example, a microcontroller 1318.

In FIG. 13, the printed circuit boards 608 are shown as connecting to rails 1310, 1312, and 1314. Two of these are labeled as 608*a* and 608*f*. Each printed circuit board (e.g. 608*a*) of the printed circuit boards 608 can be configured to control any number of MVCMs. In FIG. 13, for example printed circuit board 608*a* can be configured to control MVCM pair 1326*a* and the mirrored MVCM pair on the right side of the bus rails. This is further evident by the connections shown, connecting the MVCM pairs to the printed circuit board 608*a*. Similar connections are shown for other printed circuit boards 608 in FIG. 13, which shows each of the printed circuit boards 608 connected to the MVCM pairs to the left and right of the bus bar rails.

The components of the printed circuit boards 608 are shown in FIG. 13. These components can include at least serial peripheral interface (IsoSpi) connectors {1322*c*, 1322*d*}, switching and power delivery modules {1316*a*, 1316*b*}, a microcontroller 1318, and a low voltage connector 1320. Each of the printed circuit boards 608 shown in FIG. 13 have these identical components. The functionality of these components will be described in further detail below.

The electrical connections of the MVCM pairs to rails 1310, 1312, and 1314 will be described. The description is for one of the pairs of MVCMs, which is labeled 1326*a*. While described for the pair labeled 1326*a*, the same descriptions and connections apply to other pairs of MVCMs (e.g., {1326*b*, . . . , 1326*n*}). The single description is done for simplicity.

In aspects, the pair of MVCMs 1326*a*, can connect to the rails 1310, 1312, and 1314 by having a negative voltage terminal 1302 of the first MVCM 100*a* of the pair 1326*a* connect to the rail 1310. This connection can form the most negative voltage connection for the pair 1326*a*. In aspects, a positive voltage terminal 1308 of the second MVCM 100*b* of the pair 1326*a* can connect to the rail 1312. This connection can form the most positive voltage connection for the pair 1326*a*. The connections can be made via the configuration jumpers 606 described with respect to FIG. 6. Through these connections, the pair of MVCMs 1326*a* can connect to the main bus bar 604 to deliver a high voltage to components of the system. In aspects, the bus bar 1314 can be connected via an active switch (e.g., 1316*a*) and this switch needs to be closed to complete the circuit, otherwise there is no path for current to flow to the rails 1310 and 1312.

In aspects, the pair 1326*a* can connect to rail 1314 through two other terminals 1306 and 1324. Terminal 1306 is a positive terminal of MVCM 100*a*. Terminal 1324 is a negative terminal of MVCM 100*b*. In aspects, terminals 1306 and 1324 can connect to a switching and power delivery module 1316*a*. Again, the connections can be made via the configuration jumpers 606. In aspects, the switching and power delivery module 1316*a* can perform two primary functions. These include: (1) providing a switching mechanism to complete the circuit by which the pair of MVCMs 1326*a* can supply the main high voltage bus rails 1312/1310, and (2) providing a switching function to create a secondary mid voltage on the secondary voltage rail 1314. The circuitry can pull from either the bottom MVCM or the top MVCM to create this mid voltage without the need for transformers or DC/DC components which increases the efficiency of creating a secondary voltage. This latter functionality is also useful when MVCM voltages need to be balanced. Switching and power delivery module 1316*b* is identical to switching and power delivery module 1316*a* except it connects the pair of MVCMs on the right side of the bus bar rails to the printed circuit board 608*a*. The circuitry for both functions (1) and (2) will be discussed further below with respect to FIGS. 14 and 15.

In aspects, and as previously indicated, the printed circuit boards 608 can include IsoSpi connectors 1322*c* and 1322*d*, a microcontroller 1318, and a low voltage connector 1320. Each of the MVCMs 100*a* and 100*b* also have IsoSpi connectors 1322*a* and 1322*b*. In aspects, the IsoSpi connectors 1322*a*-1322*d* can be used as communication links that allow the MVCMs (e.g., 100*a* and 100*b*) to communicate with the printed circuit board 608*a* to which they are attached. IsoSpi is a well-known standard and a person skilled in the art reading this disclosure will know what an IsoSpi connector is. In aspects, the IsoSpi connectors 1322*a* and 1322*b* can communicate information collected by sensors of the MVCMs 100*a* and 100*b*. This information can include the cell voltage measurements, the temperatures of the cells, etc. measured by sensors. This information can be relayed to the components of the printed circuit boards 608 via its IsoSpi connector. In the case where the communications are originating from the MVCM pair 1326*a*, this would be through IsoSpi connector 1322*c*. Once received, the information can be transmitted to other components of the printed circuit board 608*a*, such as the microcontroller 1318 for further processing and so the microcontroller can execute logic to control the MVCM pair based on the information. For example, if a temperature of a MVCM (e.g., 100*a*) is determined to be too high, the information can be relayed via the IsoSpi connector 1322*a* and 1322*c* to microcontroller 1318, which can have logic to take MVCM 100*a* offline to cut it off from the rest of the system. Similarly, cell voltage measurements can be relayed to the microcontroller 1318 so the microcontroller 1318 can perform functions such as cell voltage balancing. Other functions can be performed based on what information is collected and transmitted.

The microcontroller 1318 can contain the main logic to perform control functions for each of the printed circuit boards 608. In aspects, each of the printed circuit boards 608 can have its own microcontroller similar to microcontroller 1318. In aspects, microcontroller 1318 can execute the logic to make decisions to control the MVCM pairs that it is assigned to control. The decisions can include bringing the MVCM pairs on or offline based on the needs of the system. In aspects, microcontroller 1318 can be in communication with other external systems and components, and can control the MVCM pairs based on interactions with these other external systems and components. For example, in an EV application, microcontroller 1318 can be in communication with the on board computer systems of the EV, and based on obtaining instructions from the on board computer, can adjust and/or control which MVCM pairs come online or offline. The microcontroller 1318 can also be used to deliver information to the on board computer. For example, the microcontroller 1318 can indicate the capacity of the MVCM pairs it controls to the on board computer. That information can then be used by the on board computer to inform vehicle operator of the range of the EV, before it needs to be charged. The aforementioned is merely exemplary. A person skilled in the art reading this disclosure will know what other capabilities and uses the microcontroller 1318 can have. In aspects, microcontroller 1318 can be a S32K microcontroller manufactured by NXP Semiconductor N.V. However, depending on the application in which the system is used, a different make or model of microcontroller can be used.

In aspects, the printed circuit boards 608 can each also have a low voltage connector 1320. The low voltage connector 1320 is a connector that can connect printed circuit boards 608 together. The connections can be used to communicate information between the printed circuit boards 608. For example, the printed circuit boards 608 can communicate the status of the MVCMs they are controlling to one another, or any other suitable information that is necessary to coordinate the operation between the printed circuit boards 608. In aspects, this information can be communicated using the low voltage connector 1320 and relayed to the microcontrollers of each of the printed circuit boards 608. In aspects, any controller area network (CAN) bus standard compatible connector can be used as the low voltage connector 1320.

Figure 14:
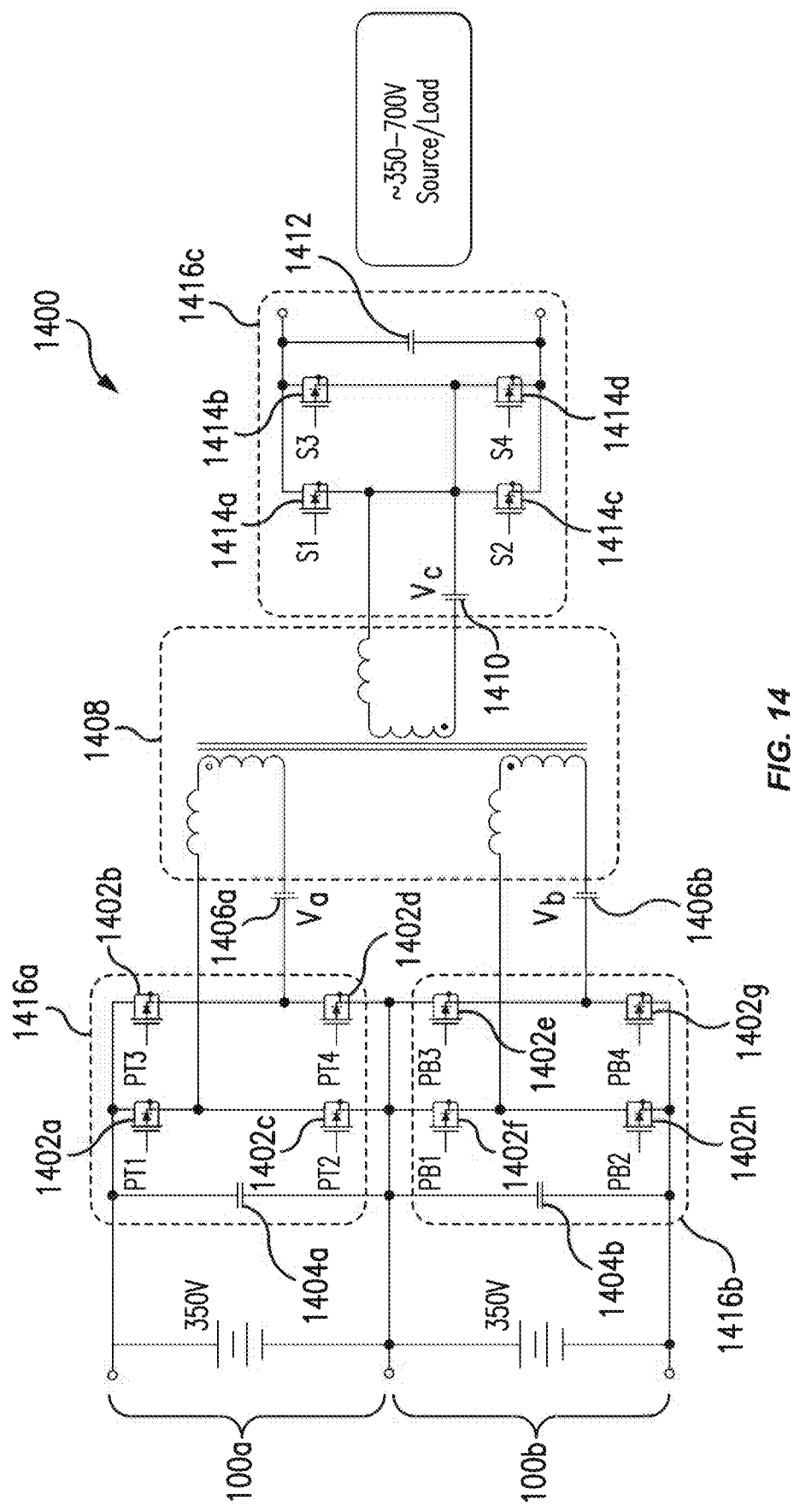
FIG. 14 shows an example circuit used to bi-directionally transfer energy to/from pairs of MVCMs and a secondary bus according to aspects of the disclosure.

FIG. 14 shows an example circuit 1400 used to bi-directionally transfer energy to/from pairs of MVCMs and a secondary bus according to aspects of the disclosure. Circuit 1400 can be implemented in switching and power delivery modules {1316a, 1316b}. Circuit 1400 shows a pair of MVCMs. For simplicity and for continuity the pair shown in FIG. 14 can be the pair 1326a (i.e., MVCM 100a and 100b) previously described with respect to FIG. 13. MVCM 100a and 100b can be connected to H-bridge circuits 1416a and 1416b. The H-bridge circuits 1416a and 1416b enable bi-directional transfer of energy from MVCMs 100a and 100b to the secondary bus via the transformer 1408. What allows the H-bridge circuits 1416a and 1416b to bi-directionally transfer energy are MOSFETs 1402a-1402h, which can work in pairs to transfer energy from the MVCMs 100a and 100b across the transformer 1408 to a further H-bridge circuit 1416c which can deliver the energy via further MOSFETs 1414a-1414d to the secondary bus. The same mechanism allows the secondary bus to transfer power to the MVCMs 100a and 100b. Capacitors 1404a-1404b, 1406a-1406b, 1410, and 1412 are used in the circuit to smooth out the signals and to reduce noise generated by the other components of circuit 1400.

Circuit 1400 allows for high power conversion efficiency using zero-voltage switching under a wide voltage range. By splitting the battery side into a dual input (Va using the H-bridge 1416a and Vb using H-bridge 1416b), circuit 1400 reduces the voltage rating requirement of the MOSFETs while also allowing for different energy transfers to occur. This is useful for battery balancing algorithms where different state-of-charge (SOC), state-of-power (SOP), and state-of-health (SOH) may be optimally controlled.

In aspects, there are two fundamental modulation techniques that can be used using circuit 1400 to transfer energy. The first is a Single Phase-Shift (SPS) technique. In the SPS technique, the frequency is fixed and the duty-cycle is kept at 50% and a phase shift is imposed between the inputs (Va, Vb) generated by the H-bridges 1416a and 1416b, and Vc on the output side at H-bridge 1416c. The phase-shift angle ($-90° \leq \varphi \leq 900$), is used to control the output power where the direction is determined by the sign of the angles between Va/Vb and Vc. The maximum power shift transfer is reached at 90° for forward mode or −90° for reverse mode. Dual input allows independent control of the Va and Vb loops. The second technique is a Pulse-Phase Modulation (PPM) technique. The PPM technique is identical to the SPS technique, but with the duty-cycle variable allowing a greater fidelity of control and the ability to reduce reactive currents.

Using the SPS and PPM techniques and circuit 1400, energy can be bi-directionally transferred between all control loops: Va+Vb to Vc, Vc to Va+Vb, Va to Vc, Vc to Va, Vb to Vc, Vc to Vb, Va to Vb, and Vb to Va. In aspects, the Vc power loop can be used for typical power take-off loads such as: air conditioning inverter/compressor, power steering, DC-DC for 12/24V battery nets, etc. The output voltages can also be configured for commercially available devices. In aspects, the Vc power loop can also be used as a source for charging. For example, on-board level-1/2 chargers with the addition of an AC/DC power factor correction (PFC) front end, and allows for flexibility in mix/matching MVCM blocks with different SOC/SOH allowing equalization.

In aspects, the architecture shown for circuit 1400 can be adapted to a dual-input, multiple-output that shares the MVCM source. For example, the source can include: AC/DC for onboard charger (~10 to 20 kW), and the loads can include: (1) DC/AC for AC inverter (mini-grid) (~10 to 20 kW), (2) DC/DC for air conditioning/power steering (~4 kW), (3) DC/DC for 24V net battery system (~4 kW), (4) DC/DC for 12V net battery system (~4 kW).

Figure 15:
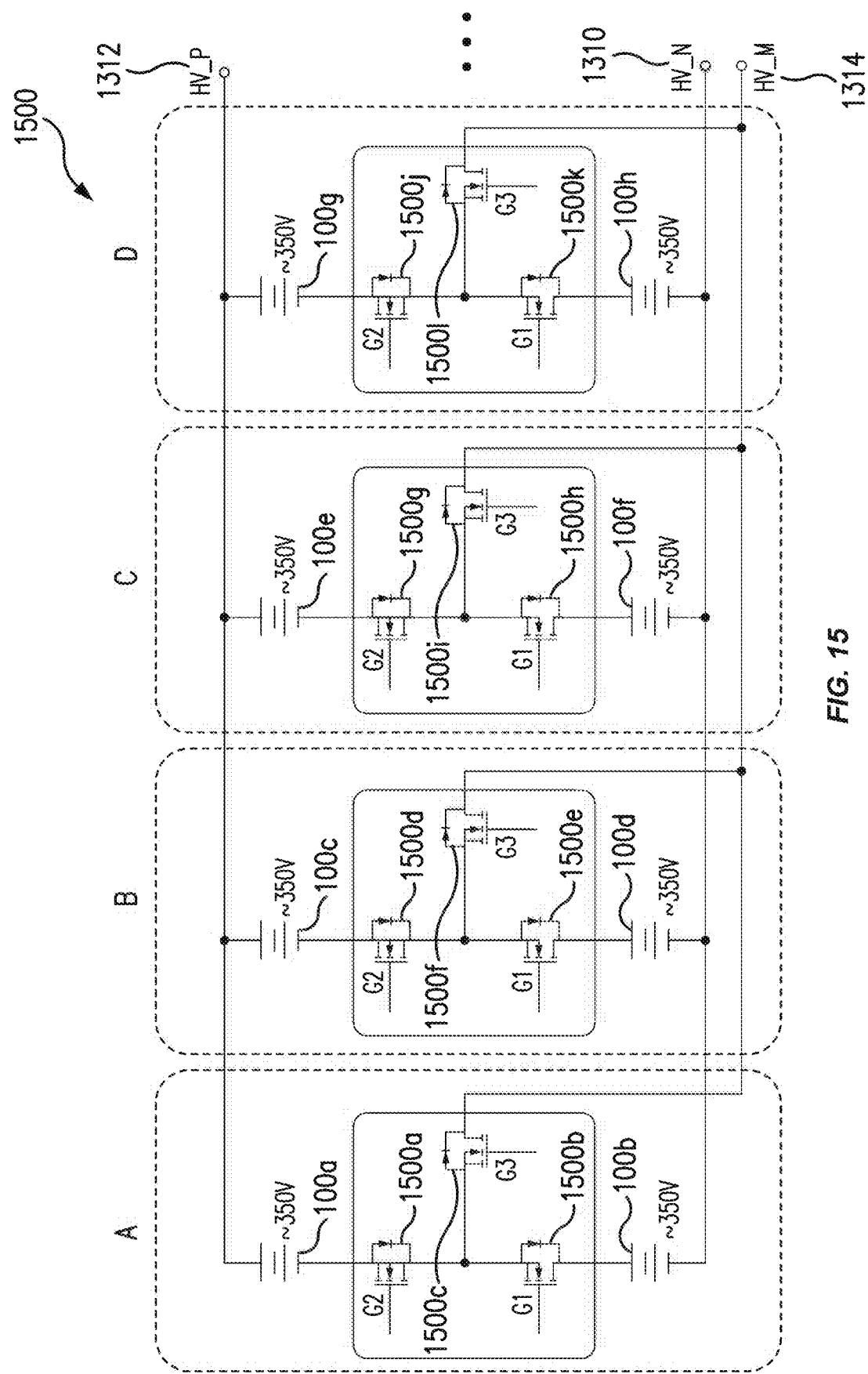
FIG. 15 shows an example circuit used to connect/disconnect the pairs of MVCMs to the secondary bus according to aspects of the disclosure.

FIG. 15 shows an example circuit 1500 used to connect/disconnect the pairs of MVCMs to the secondary bus according to aspects of the disclosure. Portions of circuit 1500 can be implemented in switching and power delivery modules (e.g., 1316a or 1316b). For example, each segment labeled "A," "B," "C," "D," etc. can be implemented in each switching and power delivery module. Circuit 1500 shows pairs of MVCMs. For example, these can correspond to the pairs of MVCMs shown in FIG. 13 (e.g., {1326a, . . . , 1326n}). As indicated with respect to FIG. 13, each of these pairs can comprise two separate MVCMs. For example, the pair 1326a can comprise MVCMs 100a and 100b. Similarly, pair 1326b can comprise MVCMs 100c and 100d. Other pairs are shown in FIG. 15 and can be represented by MVCMs labeled {100e, . . . , 100h}. In aspects, switches {1500a, . . . , 1500k} can be toggled in an on/off state to allow each of the MVCMs to connect to the secondary bus (i.e., bus bar 1314). The switches can be implemented by MOSFETs. In aspects, the toggling can be controlled by the microcontroller of the printed circuit boards 608 assigned to control the MVCM pairs.

The above description and embodiments of the disclosed MVCM 100, MVCB 500, and system are not intended to be exhaustive or to limit the disclosed MVCM 100, MVCB 500, and system. While specific examples for the MVCM 100, MVCB 500, and system are described above for illustrative purposes, various equivalent modifications are possible within the scope of the disclosed MVCM 100, MVCB 500, and system, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

Dynamic System Control/Configuration

Figure 16:
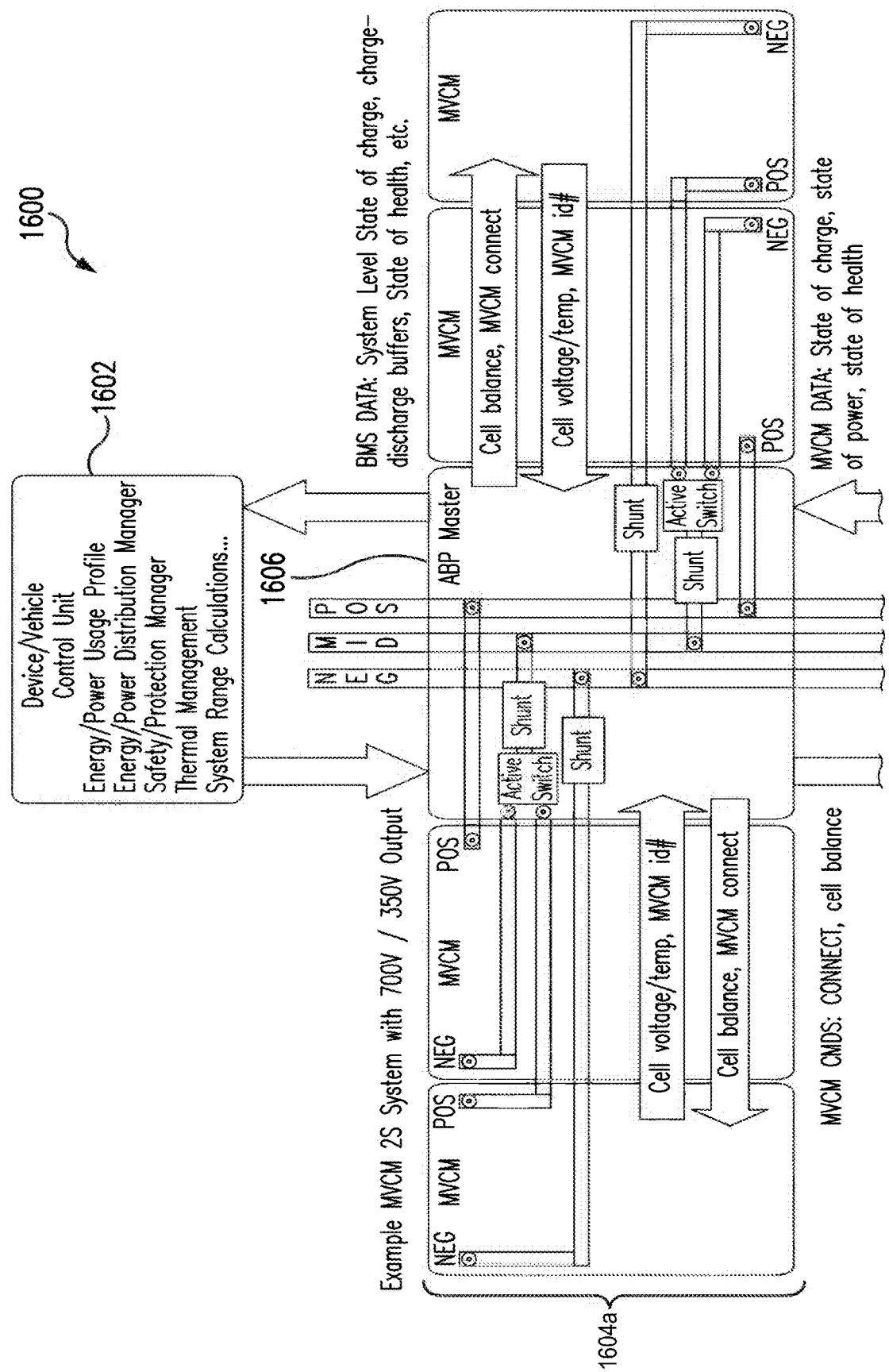
FIG. 16 shows an example system level diagram showing how dynamic system control and configuration is performed between a device and the MVCB with connected MVCM pairs installed thereon according to aspects of the disclosure.
Figure 16:
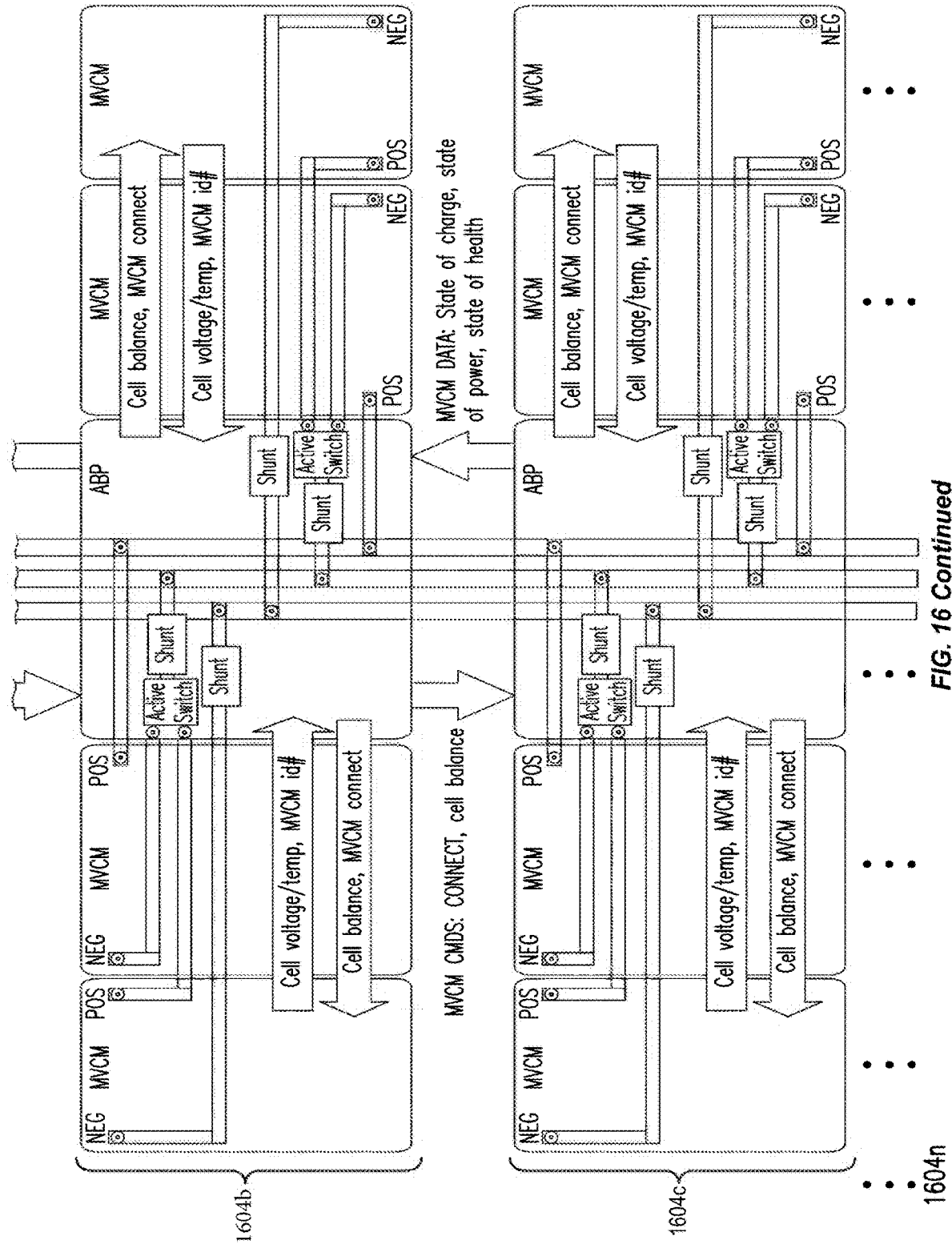

FIG. 16 shows an example system level diagram 1600 showing how dynamic system control and configuration is performed between a device 1602 and the MVCB with connected MVCM pairs {1604a, 1604b, 1604c . . . , 1604n} installed thereon according to aspects of the disclosure. The connections shown between the MVCB and MVCM pairs are the same as those described with respect to FIGS. 13-15 and all the disclosures related to the circuitry, connections, and functions described with respect to those figures applies to FIG. 16.

In aspects, dynamic system control and configuration can be implemented using software. In aspects, the software can be stored on a non-transitory computer readable medium on hardware components of the device 1602 and/or the MVCB. For example, the software can be stored on a memory component or module of the printed circuit boards (PCBs) 608 of the MVCB, and can be executed by one or more of the microcontrollers of the PCBs 608 (e.g., microcontroller 1318). If the software is implemented across the device 1602 and the MVCB, the portions of the software can be stored on non-transitory computer readable media stored in memory components or modules on the device 1602 and MVCB, and can have the portions executed by a microcontroller or processors of these devices. If implemented amongst these devices, the software installed on each of the devices can work in conjunction with each other to implement the dynamic system control and configuration. The software can interface via application programming interfaces (APIs), or via other interfaces that allow the software to pass data back and forth between the components to control the delivery of energy to and from the device 1602 and the MVCB/MVCMs.

Dynamic system control and configuration can be invoked and/or relates to instances when the system is being brought on or offline, or in the instances where the system is operationally functioning and being monitored to determine the energy requirements of the device 1602. In such instances, the system needs to be initialized, configured, and monitored to determine the energy needs of the device 1602, and to determine how much energy can be delivered by the MVCMs to the device 1602. The dynamic system control and configuration is an example process by which this initialization, configuration, and monitoring is performed, and shows how information and energy is transmitted bi-directionally between components to perform the initialization, configuration, and monitoring so that the appropriate amount of energy can be delivered to the device 1602. In instances, energy can also be transmitted from the device 1602 to the MVCMs in the case where the device 1602 serves as a charging port/station for the cells of the MVCMs.

In aspects, the device 1602 can be one of a vehicle (a car, a truck, an airplane, a boat, etc.), or part of a device that serves as a wall or part of a wall for a house that uses the system for a home energy storage application, or any other large grid-tie system application. These are exemplary of what the device 1602 can be, and those skilled in the art will recognize the use cases based on this disclosure. For the purposes of FIG. 16, the dynamic system control and configuration will be described assuming the device 1602 is a vehicle on which the MVCB/MVCMs are attached, for example, the underside of an Electric Vehicle (EV).

In aspects, dynamic system control and configuration can begin when the device 1602 indicates to the MVCB that the device 1602 is powered on and needs energy to perform its functions. In the instance where device 1602 is a vehicle, this can be done when the vehicle is powered on via an ignition switch, button, etc. In aspects, the device 1602 can send a signal to a microcontroller on a PCB of the MVCB. In aspects, the microcontroller can be the microcontroller of a master PCB 1606. The master PCB 1606 refers to a PCB of the MVCB that serves as an interface between the device 1602 and the rest of the MVCB PCBs (and their components) and the MVCMs. The master PCB 1606 can contain the logic that can perform the coordination functions to gather and transmit data to/from the device 1602 and the MVCB PCBs and the MVCMs.

In aspects, once the master PCB 1606 receives the signal, it can perform a handshake process so the device 1602 can be connected to the MVCB so that data can be passed back and forth between the MVCB, MVCMs, and the device 1602. In aspects, the device 1602 can transmit (and the master PCB 1606 can receive) energy requirement information of the device 1602. In order to transmit the energy requirement information, the device 1602 can have one or more modules that can perform system range calculations indicating the energy requirements of the device 1602. For example, the system range calculations refer to values or computations indicating the energy requirements of the device 1602 over a period of time or a distance. For example, in the case when the device is a vehicle, the system range calculations can indicate how much energy the vehicle needs to travel a distance or how much energy the vehicle needs if it is to travel for a period of time, etc. In order to facilitate these system range calculations, the device 1602 can have various other modules, components, or data files that can store data and/or perform or be used in performing computations or measurements that can be used to determine the system range calculations. Additionally, the device 1602 can have various modules or components that can distribute any energy transmitted to the device 1602 based on the MVCMs sending energy to the device 1602 based on the energy requirement information. For example, and in aspects, the modules, components, and/or data files can include:

An Energy/Power Usage Profile, which can indicate how much energy the device 1602 uses when running at full capacity, what components (AC units, power steering, etc.) require energy and how much, what the minimum amount of energy required to power the device 1602 is, etc.

An Energy/Power Distribution Manager, which can have a set of rules indicating and managing how energy is distributed amongst the components of the device 1602 once it is received.

An Energy/Power Load Manager, which can facilitate the distribution of the energy to the components of the device 1602.

A Safety/Protection Manager, which can serve to monitor how much energy is received by the device 1602 and monitor for any irregularities, surges in energy, or sudden depletion of energy, so that any dangerous scenarios leading to meltdowns, fires, explosions, etc. can be avoided.

A Thermal Management module, which can work in conjunction with the Safety/Protection Manager to monitor the temperature of the device 1602 and monitor for any overheating conditions and/or assist in the heating/cooling of components.

The aforementioned are exemplary modules, components, and/or data files that the device 1602 can have, that can be used to determine the system range calculations. The above mentioned modules can be used to determine the system range calculations because they can be factors as to how much energy is being used, needs to be used, or is expected to be used. In aspects, the system range calculations can be performed continuously and can be dynamic. Based on various conditions that the device 1602 encounters and/or changes in circumstances for the device 1602, the system range calculations can change dynamically, thus changing the energy requirements for the device 1602. In aspects, this can trigger more or less energy to be delivered to the device 1602 by the MVCMs.

In aspects, the master PCB 1606 can also receive, from one or more of the MVCMs, information indicating an energy state of each of the MVCMs. This information can be used, in conjunction with the energy requirement information received from the device 1602, to determine whether the MVCMs can deliver the required energy to the device 1602. In aspects, the information indicating the energy state of each of the MVCMs can include a cell voltage, a cell temperature, and a cell identification value. The cell voltage can indicate how much voltage each of the cells in the MVCMs can deliver individually or in aggregate. The cell temperature can indicate the temperature of each of the cells in the MVCMs individually or in aggregate. The cell identification can be a value identifying from which cell or cell group the information is coming. In aspects, each cell of the MVCMs or each of the MVCMs can have its own unique cell identification value.

In aspects, based on the information indicating an energy state of each of the MVCMs, the master PCB 1606 can execute logic to determine how many and which MVCMs are available to deliver energy to the device 1606 based on the energy requirement information and the information indicating the energy state of each of the MVCMs. In aspects, once it is determined how many and which MVCMs are available to deliver energy to the device 1602, the master PCB 1606 can switch on (to an online state), each of the MVCMs or MVCM pairs available to deliver energy to the device 1602. In aspects, this can be done by having the microcontroller of the master PCB 1606 generate a signal or series of signals that result in a switch being turned on to connect the MVCMs to the bus bars (the main bus bar 604 and the secondary bus) to deliver energy to the device 1602. This can be done by, for example, transmitting signals to each of the switching and power delivery modules (e.g., 1316a, 1316b, etc.) of each of the PCBs of the MVCB, to turn those switches on for the MVCMs determined to be able to deliver energy to the device 1602, by connecting them to the bus bars.

In aspects, once the MVCMs are connected to the bus bars, the microcontroller of the master PCB 1606 can monitor each of the MVCMs and the energy requirement information continually transmitted by the device 1602, to determine if there are any changes to the energy requirement information or the information indicating the energy state of each of the MVCMs such that any MVCMs have to be brought on or offline to meet the energy requirements of the device 1602. If any changes in the energy requirement information or the information indicating the energy state of each of the MVCMs are detected, the microcontroller can determine whether any of the MVCMs should be disconnected or connected to meet energy requirements of the device 1602. For example, if the device 1602 sends an updated system range calculation indicating that it will be travelling farther than originally planned or taking a detour, additional MVCMs can be connected to the bus bars to deliver the extra energy needed to complete the route. In another example, if the device 1602 indicates that additional components are being used such as AC units, power steering, heaters, etc. that require extra energy, additional MVCMs can be connected to the bus bars to deliver the extra energy required by these components.

In aspects, the same monitoring can result in MVCMs being disconnected from the bus bars. For example, if certain cells of the MVCMs drop below a threshold voltage so that they cannot be rebalanced to store additional energy and they cannot deliver sufficient energy to the device 1602, they can be disconnected from the system. Another scenario in which MVCMs can be disconnected is if the cells of one of the MVCMs get damaged, overheat, or fail. In this case, the MVCM in which the cells are housed can be disconnected from the bus bars using the active switches and circuitry discussed with respect to FIGS. 14 and 15.

The ability to connect and disconnect MVCMs is a significant improvement over conventional battery systems because in conventional systems, when one of the cells fails the entire system must be shut down, because conventional systems are configured to operate based on the lowest voltage cell and once that lowest voltage cell no longer delivers power everything has to be disconnected. In the disclosed system, this is not the case and MVCMs can be disconnected from the system and voltages can be rebalanced dynamically to keep the device 1602 operational. Additionally, conventional systems cannot connect MVCMs dynamically to add additional power to the device 1602 if needed. This ability to connect and disconnect MVCMs is an important feature that allows for the system to be flexible and modularized. It is also important for safety because if any of the MVCMs fails, is faulty, and/or poses a safety threat (e.g., threat of explosion, fire, etc.), it can be quickly disconnected with minimal disruption to the operation of the device 1602.

In aspects, the master PCB 1606 can also deliver information about the state of the MVCMs to the device 1602 so that the device 1602 can be aware of the MVCMs ability to deliver energy to the device 1602. In aspects, this information can be used to provide feedback to an operator or computer of the device 1602, so that the operator or computer can determine how much energy it can expect from the MVCMs. For example, state of energy (SOE), state of charge (SOC), and state of health (SOH) information of one or more of the MVCMs can be collected by the master PCB 1606 and can be transmitted to the modules, components, data files, etc. of the device 1602. This information can be displayed on a display unit of the device 1602 (e.g., a screen or display of the vehicle) to notify the operator or can be used in computations performed by a computer of the device 1602. In aspects, based on this information the operator or computer can adjust the operation of components of the device 1602 to accommodate its energy requirements. For example, if the information about the state of the MVCMs indicates that some of the MVCMs cannot deliver enough energy so that the device 1602 cannot complete its planned route, the operator and/or computer of the device 1602 can be alerted, and can take corrective/remedial action, such as shut off unnecessary components using energy (e.g., AC units, power steering, heating systems, etc.) so as to conserve and divert energy to other components of the device 1602 (e.g., the engine, transmission, etc.) to allow it to complete its route.

In aspects, based on the dynamic adjustments that can occur and energy requirements of the device 1602, the voltages of the cells of the MVCMs need to be adjusted. Thus, the device 1602 and/or the microcontroller of the master PCB 1606 can send rebalance signals to the MVCMs to rebalance the voltages across their cells.

Enhanced Safety System

The system described with respect to FIG. 16 can also have software implemented to provide enhanced safety features. In aspects, the software can be stored in memory devices of the master PCB 1606 and executed using the microprocessor of the master PCB 1606. The software can implement the enhanced safety features by continuously monitoring certain parameters for each of the MVCM pairs and compare these parameters to threshold values. If it is determined that the parameters exceed or drop below certain operating ranges as indicated by the threshold values, the software can take certain actions. In aspects, these can include: (1) take no action, (2) give a warning to an operator or further components of the system, (3) reduce performance, or (4) disconnect energy blocks (i.e., MVCMs) from the system. Which action is taken is based on the various parameters exceeding or dropping below certain operating ranges that can be customized and/or determined by a designer of the system.

In aspects, the parameters that can be continuously monitored can include: (1) Over-Current of the MVCMs, (2) State of Charge of the MVCMs, (3) State of Power of the MVCMs, (4) State of Health of MVCMs, (5) Cell over/under temperature of the MVCMs, (6) Cell over/under voltage of the MVCMs, (7) Communications to/from MVCMs. In aspects, each of these parameters can have its own threshold values that can prompt the system to take a safety action. The values above and/or below the threshold values can indicate a failure in overall system, which can result in some or all of the MVCMs being disconnected so that they no longer deliver energy to the device 1602.

The Over-Current refers to an amount of current measured going into/out of each of the MVCM pairs. This can be measured using a shunt circuit (as discussed with respect to FIGS. 14 and 15). If the current exceeds threshold values for current going into/out of each of the MVCM pairs, the microcontroller can send a signal to, for example, activate a switch to shut off or disconnect the MVCM pair from the rest of the system. In aspects, the thresholds can be based on the cell chemistry characteristics for both charge and discharge. For example, with 2 cells in parallel the discharge maximum can be 80 A and the charge maximum could be 30 A.

The State of Charge refers to the battery cell level of charge relative to its capacity (gas gauge function equivalent). Thresholds for the State of Charge can be 100% and 0% depicting the operating range of the battery cell.

The State of Power refers to the battery available power that may be safely drawn from the battery cells. Thresholds for the State of Power can be 40 kw for each MVCM pair.

The State of Health refers to the battery capacity and resistance for the battery cells relative to its ideal when new. Thresholds for the State of Health can be between 100-80% typically before service would be recommended.

The Cell over/under temperature refers to the temperature of the battery cells of the MVCMs. Thresholds for the battery cells can be 60 degrees Celsius for the cell over temperature and −30 degrees Celsius for the cell under temperature.

The Cell over/under voltage refers to the voltage value of the MVCMs. Thresholds for the Cell over/under voltage can be for example, 2.7V on the minimum and 4.2V on the maximum. Therefore if the cell voltage drops below or goes above these voltages a safety action can be taken.

The Communication to/from the MVCMs refers to communication signals coming from or going to MVMCs. In aspects, the master PCB 1606 can send check status signals or heartbeat signals to the MVCM pairs. If there is no response after a threshold period of time, e.g., in milliseconds, seconds, etc., the microcontroller can determine that there is something wrong with the MVCMs and take a safety action.

The above described enhanced safety features improve conventional systems because conventional systems do not have the ability to dynamically monitor and disconnect MVCMs or cells from the rest of the system, and allow a device, to continue operation. This is a unique aspect of the disclosed energy system. Conventional systems merely shut the entire system down or disconnect all the battery cells when a safety condition is encountered. Thus, the disclosed system provides significant improvement because it has the ability to isolate a faulty part of the battery system while allowing the overall system to continue functioning.

Adaptive Range Calculation

As discussed with respect to FIG. 16, the device 1602 can perform dynamic system range calculations. As previously indicated, the system range calculations can be affected by and/or take into account the State of Charge, State of Health, Cell temperature connection status of the MVCMs. In aspects, software components in the master PCB 1606 continuously monitor the aforementioned parameters and provide them to the device 1602 to calculate the system range calculations. In aspects, the software, based on the parameters, can continuously and statistically estimate: (1) a dynamic total capacity (energy block total capacity) based on how many MVCMs are online, (2) how much fuel/energy those MVCMs have to deliver, (3) an estimate of how much power will be consumed by the device 1602 during its trip, and (4) drivetrain statistical mileage per kWh.

As indicated, these statistics can change dynamically and computations are continuously made based on potentially changed parameters and circumstances. For example, if MVCMs are disconnected, this will change the system's overall capacity to deliver power to a vehicle, and therefore, the system range calculations will need to be performed to inform what the vehicle's requirements are and how much the power the MVCMs can deliver. It may be that power will have to be diverted to/from components (e.g., AC units, heaters, etc.) so that the vehicle can complete its journey based on the updated system range calculations.

The disclosed system is unique in that its system range calculations can dynamically account for the fact that MVCMs can be connected and disconnected from the battery management system. Conventional systems do not have such system range calculations that account for these conditions because typically battery management systems do not have the ability to connect/disconnect energy blocks (i.e., MVCMs).

Adaptive Connection/Balancing

As previously indicated with respect to FIG. 16, the one of the novel features of the system is that it can bring MVCMs online and offline dynamically. An issue arises when trying to bring MVCMs online, which is that the MVCMs have to have their voltages matched to the voltages of the other MVCMs already online before they can be connected to the system. For example, taking the instance where MVCMs are installed and each has a State of Charge that is full charge. The other MVCMs in operation for the system can be partially charged because they have been in use. The newly installed MVCMs would need to have their voltage balanced to match the rest of the MVCMs before they can be brought online and connected with the rest of the system. The danger of not doing this balancing is that if the newly installed MVCMs were brought online when there is a voltage differential, a huge inrush of current would occur into the system and cause the wires and bus bars to potentially burn or get damaged as a result of the heat generated. This would cause a potentially hazardous condition.

Typically, how this situation is dealt with is to manually balance the voltages if new MVCMs are installed. This would typically be done by a technician, who would have to measure the system voltage of the MVCMs and manually charge or discharge the MVCMs to bring them within the same range and then connect the newly installed MVCMs. This is highly undesirable because can only occur when the device 1602 is inoperable. It is also time consuming and requires a third party.

The disclosed system provides a software mechanism that automates this process and dynamically brings the MVCMs online by performing a monitoring and determination of when to bring any MVCMs online. In aspects, this can be done by having software installed on the master PCB 1606 monitor for any MVCMs that are waiting to be brought online. This can happen by the MVCMs sending a signal to the master PCB 1606 indicating they would like to be queued to be brought back online. In aspects, once notified that there are MVCMs waiting to be brought online, the master PCB 1606 can compute the State of Charge and average open circuit voltage for the MVCMs waiting to be brought online to determine what voltage they are at. In aspects, a connection eddy current is computed for each energy block in the pool using a direct current resistance. In aspects, a connection vector is determined based upon allowable eddy current and State of Charge ranges for connecting the MVCMs to the rest of the system. In aspects, the system can wait until the ranges are in line between the MVCMs waiting to be brought online and the rest of the MVCMs.

There are typically two ways in which the voltages and eddy currents can be brought in line. The first is that the MVCMs that are already online have to be charged to be brought up to the same voltage of the MVCMs waiting to be brought online. The second is to discharge the MVCMs that are waiting to be brought online to a lower voltage level so they can match the rest of the MVCMs currently online. In aspects, this can be done using resistors to dissipate the current of the MVCMs waiting to be brought online. Alternatively, the MVCMs waiting to be brought online can be used in auxiliary functions to dissipate some of their energy so that when they are brought down to the same voltage as the other MVCMs they can be connected to the rest of the system.

In aspects, balancing algorithms can be used that have the following calibratable targets to bring MVCMs online: (1) SOC at a calibratable target with minimal passive balancing (i.e., the SOC's are equal when SOC is at a target percentage: 0%, 50%, 100%); (2) offline energy blocks once they hit a minimum SOC level (needs SOP coordination); (3) offline energy blocks once they hit a maximum SOC level (needs SOP and charging coordination).

In aspects, inter-energy block cell balancing is accomplished using passive balancing with calibratable modes: passive balance allowed per calibratable operating envelopes; passive balance during charge only; passive balance uninhibited.

In aspects, energy block to block balancing is accomplished by bringing modules online/offline dynamically when SOC range is close enough and eddy currents are small enough (both calibratable). In aspects, this occurs during charge and discharge cycling that will allow all MVCMs waiting to be connected to connect.

In aspects, an out of range energy block (MVCM) can be brought online by utilizing active components (such as resistors) to dissipate the energy of the block and bring it in line with the rest of the MVCMs.

The aforementioned improves conventional systems because it provides an automated way of bringing MVCMs online. As indicated, conventionally, this has to be done manually. However, the disclosed system allows this process to be automated and controlled through software. Moreover, this process can be done while the device 1602 is operational. This is an improvement over conventional systems in which this process would have to be done when the device 1602 is not operational.

Adaptive SOC/SOP/SOH Computations

As indicated with respect to FIG. 16, the system is dynamically able to bring MVCMs online or offline. This inevitably affects the computations done with respect to the State of Charge (SOC), State of Power (SOP), and State of Health (SOH) of the MVCMs. This information is critical to the device 1602, which needs to know this information in order to perform the system range calculations and various other computations to determine how best to use the available energy the MVCMs can provide to operate and perform its functions. Thus, these various parameters such as the SOC, SOP, and SOH have to be computed taking this dynamic nature into account.

Thus, in aspects, when computing the SOC, SOP, and/or SOH, the system must account for factors such as: energy block connection status, different current flows, eddy currents when energy blocks are connected, SOH direct current resistance, SOH capacity of the MVCMs, different SOP of the MVCMs, different temperatures of the MVCMs.

Typical computations for these parameters in conventional battery management systems do not account for such factors because they do not have to. This is because conventional systems do not have the capability to bring energy units (i.e., the MVCMs) online and offline dynamically. Thus, the computations performed by the system are unique and custom given its ability to perform this dynamic bringing online/offline of energy components.

Adaptive Thermal Estimation

As indicated with respect to FIG. 16, the system is dynamically able to bring MVCMs online or offline. This inevitably affects the computations done with respect to the thermal properties of the MVCMs. This information is critical to the device 1602, which needs to know this information in order to perform the system range calculations and various other computations to determine how best to use the available energy the MVCMs can provide to operate and perform its functions. Similar to the considerations as described with respect to the computations done for the SOC, SOP, and SOH, computations regarding the thermal properties have to be computed taking this dynamic nature into account.

In aspects, when computing the thermal properties, the system must account for factors such as: energy block connection status, different current flows, eddy currents when energy blocks are connected, different temperatures of the MVCMs, different SOC and SOH of each of the MVCMs.

Adaptive On-Board Diagnostics

Because of the dynamic nature of the system, the diagnostics of the MVCMs also has to be computed dynamically by software of the master PCB 1606. Parameters such as: Cell over/under/out-of-range current sense, Cell over/under/out-of-range voltage sense, Cell over/under/out-of-range temperature sense, Cell over/under SOC, Cell over/under SOH-discharge capacity resistance (DCR), Cell over/under SOH-capacity, Cell open/short of a bus bar, Energy block open/short of a bus bar are continuously monitored for each of the MVCMs. In aspects, the master PCB 1606 can store these and other calculations for the MVCMs locally in memory components. In this way, if the MVCMs are moved or relocated within the system (connected, disconnected, etc.), the MVCM state information can be known and accessed. This can be done using the cell identification value, which can be used to track the state of each of the cells in the MVCM and/or the MVCMs.

Applications/Improvements Provided by the System

The system provides several enhancements, improvements, and benefits compared to the conventional system.

With respect to safety, the system by being modularized and controllable using active switches to bring MVCMs online/offline, can provide enhanced safety in situations when the system is used in EVs and when the EV crashes. For example, in the event of an EV cash, the MVCMs can be disconnected in order to minimize high voltage short-circuits that may cause explosions and fires.

With respect to SOH balancing, MVCMs with lower SOH as determined by the threshold conditions previously discussed can have their usage reduced during normal driving cycles in EV applications. On the other hand, MVCMs with higher SOH as determined by the threshold conditions previously discussed can have higher usage rates. In this way, the system can maximize its SOH/capacity to deliver power over its lifecycle and increases the lifecycle of the battery backs. Additionally, unhealthy MVCMs can be disconnected and kept in a monitored safe-state.

The system, by continuously detecting and monitoring the energy requirements of devices and the state of the MVCMs can provide enhanced/improved diagnostic and safety features. For example, when the system is offline, a continuous safety monitor can run at a calibratable frequency and transition from a sleep state when the system needs to come back online. Additionally, an internal isolation detection can be performed and determined/detect isolation resistance conditions that may cause undesirable shorting or grounding. In aspects, the determination/detection can be done by cycling through the healthy pool of MVCMs. In aspects, this can be done in addition to the discharge monitoring.

In aspects, the system provides for improved balancing of MVCMs to deliver power to components without wasteful passive techniques. For example, using active switches, the secondary bus bar (1314) can be activated to deliver power to components requiring lower voltages.

In aspects, the system can also improve/enhance charging of the MVCMs. For example, because the MVCM pairs can be brought on and offline using active switches MVCMs that are at full charge can be disconnected during charging so that the energy used to charge the MVCMs can be delivered to those MVCMs that need to be charged. This also speeds up charging by not having to protect for the highest SOC.

In aspects, the system can also improve discharging range by disconnecting MVCMs that are empty. This can extend the range of the system in applications because by disconnecting MVCMs that are empty, the system no longer has to protect for the lowest SOC.

In aspects, the system also improves safety/SOH by differentiating between individual MVCM end-points. This allows maximum capacity and power to be delivered by the MVCMs without being driven by the weakest MVCMs. Conventional systems are driven by the weakest cells and when the weakest cells go offline, the entire system has to be shut down. This feature is made possible because of the use of active switches that can bring individual MVCM pairs online/offline to allow for continued operation.

Method of Manufacturing an MVCM

Figure 17:
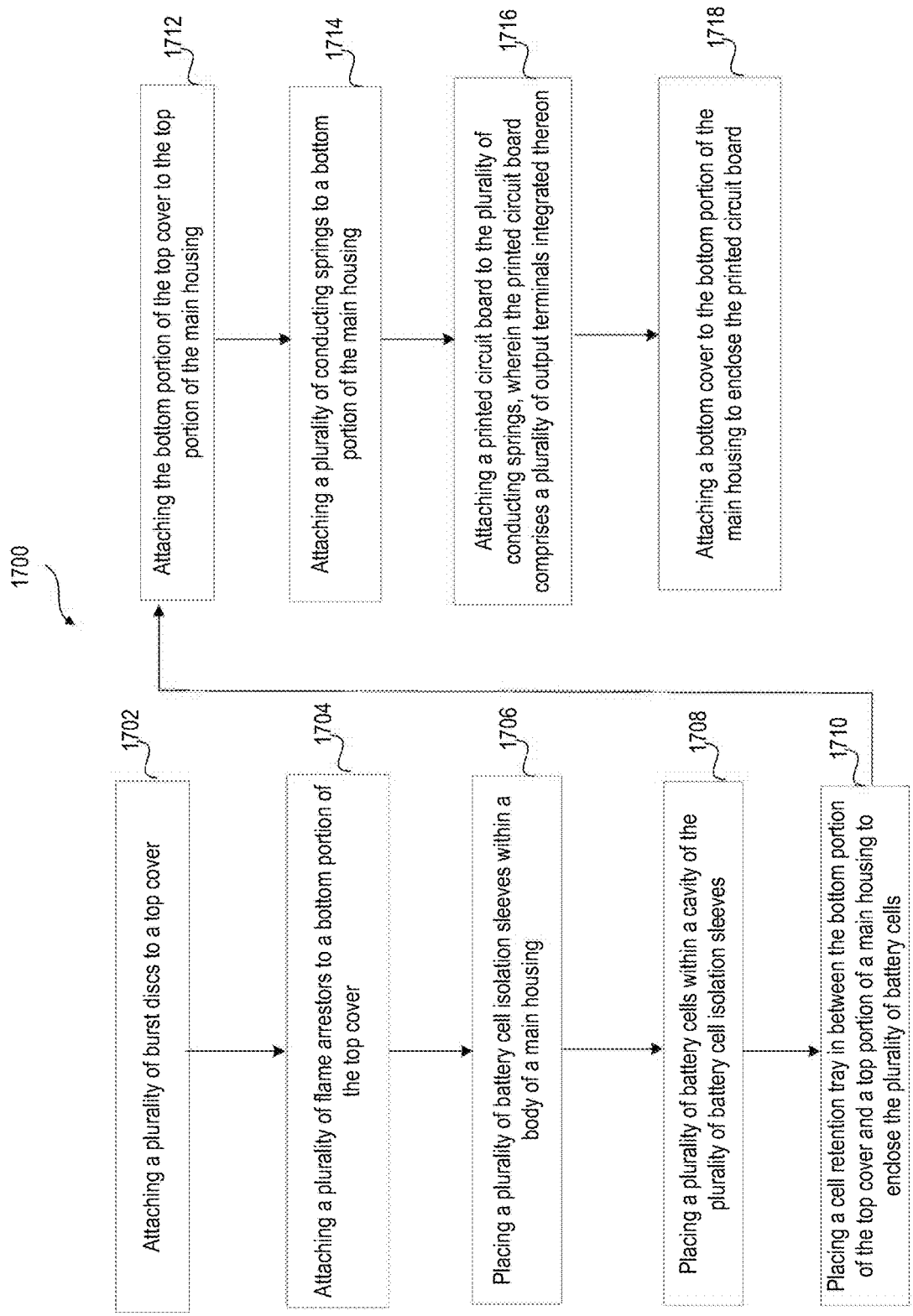
FIG. 17 shows an example method of manufacturing the MVCMs according to aspects.

FIG. 17 shows an example method 1700 of manufacturing the MVCMs according to aspects. Method 1700 is shown as a series of steps. At step 1702, a plurality of burst discs are attached to a top cover. At step 1704, a plurality of flame arrestors are attached to a bottom portion of the top cover. At step 1706, a plurality of battery cell isolation sleeves are placed within a body of a main housing. At step 1708, a plurality of battery cells are placed within a cavity of the plurality of battery cell isolation sleeves. At step 1710, a cell retention tray is placed in between the bottom portion of the top cover and a top portion of a main housing to enclose the plurality of battery cells. At step 1712, the bottom portion of the top cover is attached to the top portion of the main housing. At step 1714, a plurality of conducting springs are attached to a bottom portion of the main housing. At step 1716, a printed circuit board is attached to the plurality of conducting springs, wherein the printed circuit board comprises a plurality of output terminals integrated thereon. At step 1718, a bottom cover is attached to the bottom portion of the main housing to enclose the printed circuit board.

Method of Manufacturing an MVCB

Figure 18:
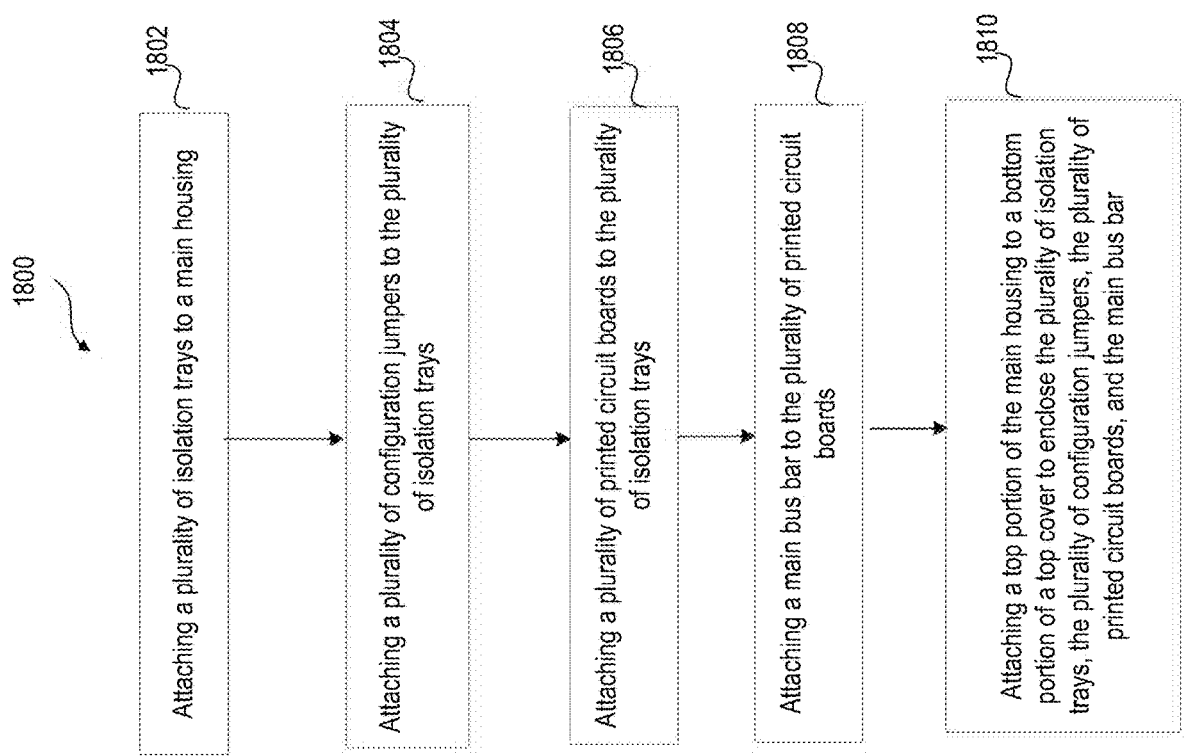
FIG. 18 shows an example method of manufacturing the MVCBs according to aspects.

FIG. 18 shows an example method 1800 of manufacturing the MVCBs according to aspects. Method 1800 is shown as a series of steps. At step 1802 a plurality of isolation trays is attached to a main housing. At step 1804, a plurality of configuration jumpers is attached to the plurality of isolation trays. At step 1806, a plurality of printed circuit boards is attached to the plurality of isolation trays. At step 1808, a main bus bar is attached to the plurality of printed circuit boards. At step 1810, a top portion of the main housing is attached to a bottom portion of a top cover to enclose the plurality of isolation trays, the plurality of configuration jumpers, the plurality of printed circuit boards, and the main bus bar.

Method of Performing Dynamic Energy Control

Figure 19:
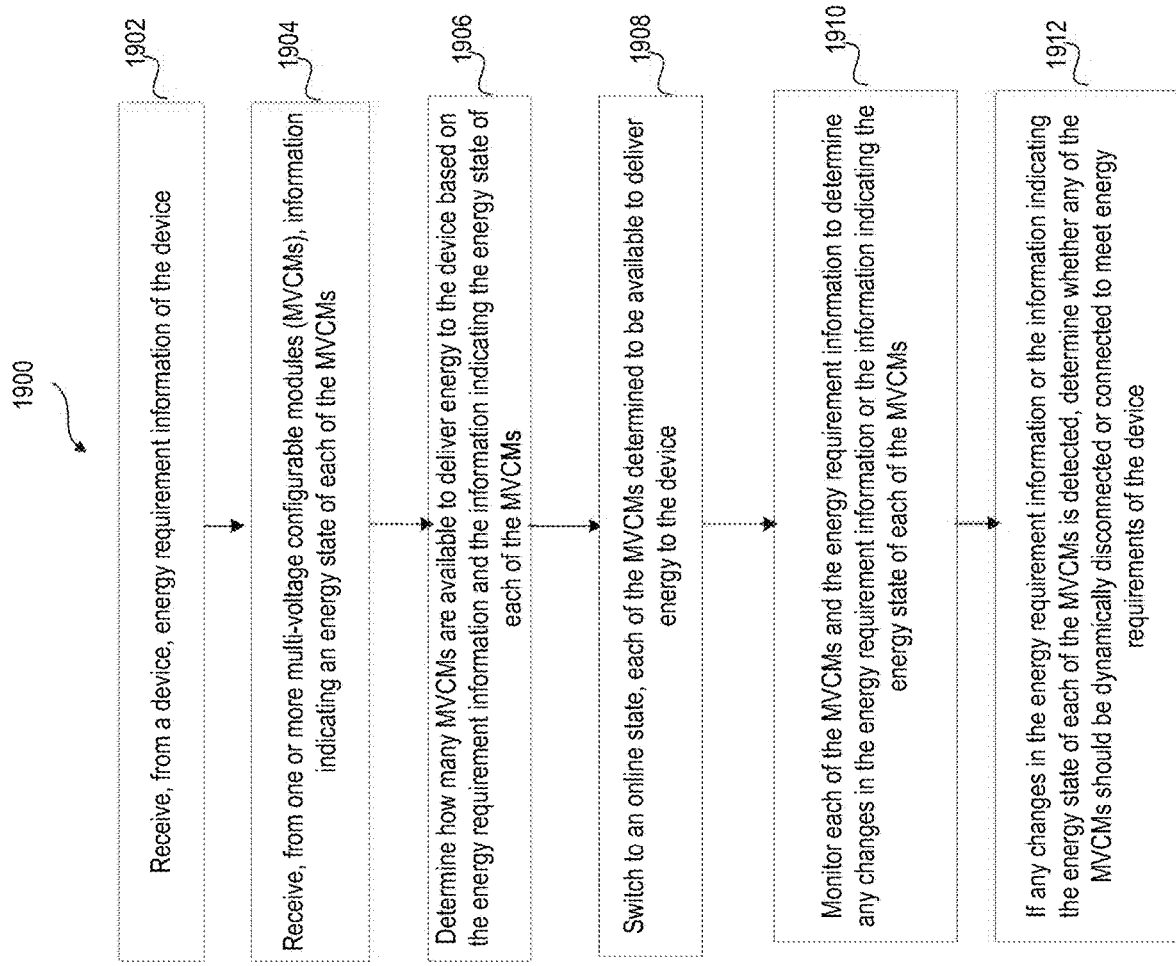
FIG. 19 shows a method of performing dynamic energy control according to aspects.

FIG. 19 shows a method 1900 of performing dynamic energy control according to aspects. Method 1900 can be performed using a microcontroller of the master PCB 1606. The microcontroller can execute instructions stored on a non-transitory computer readable medium to perform the functions of method 1900. Method 1900 is shown as a series of steps. At step 1902, energy requirement information of a device (e.g., device 1602) is received from the device. At step 1904, information indicating an energy state of each of the MVCMs is received. At step 1906, a determination is made as to how many MVCMs are available to deliver energy to the device based on the energy requirement information and the information indicating the energy state of each of the MVCMs. At step 1908, each of the MVCMs determined to be available to deliver energy to the device is switched to an online state. At step 1910, each of the MVCMs and the energy requirement information is monitored to determine any changes in the energy requirement information or the information indicating the energy state of each of the MVCMs. At step 1912, if any changes in the energy requirement information or the information indicating the energy state of each of the MVCMs are detected, a determination is made whether any of the MVCMs should be dynamically disconnected or connected to meet energy requirements of the device. The dynamic disconnection or connection can be done using active switches as discussed with respect to FIGS. 1-16.

It is to be appreciated that the Detailed Description section, and not the Abstract is intended to be used to interpret the claims. The Abstract section may set forth one or more but not all possible embodiments of the present disclosure as contemplated by the inventor(s), and thus, are not intended to limit the claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A method of manufacture of a multi-voltage configurable module (MVCM) comprising:
   attaching a plurality of burst discs to a top cover;
   attaching a plurality of flame arrestors to a bottom portion of the top cover;
   placing a plurality of battery cell isolation sleeves within a body of a main housing;
   placing a plurality of battery cells within cavities of the plurality of battery cell isolation sleeves, each of the plurality of battery cells being placed in a separate battery cell isolation sleeve;
   placing a cell retention tray in between the bottom portion of the top cover and a top portion of the main housing to enclose the plurality of battery cells;
   attaching the bottom portion of the top cover to the top portion of the main housing;
   attaching a plurality of conducting springs to a bottom portion of the main housing;
   attaching a printed circuit board to the plurality of conducting springs, wherein the printed circuit board comprises a plurality of output terminals integrated thereon;
   coupling a plurality of conducting nails to the plurality of battery cells and the printed circuit board; and
   attaching a bottom cover to the bottom portion of the main housing to enclose the printed circuit board.

2. The method of claim 1, further comprising placing a plurality of battery cell isolators at a bottom portion of the plurality of battery cell isolation sleeves.

3. The method of claim 1, wherein:
   the cell retention tray is a single structure; and
   the cell retention tray retains all battery cells of the resulting MVCM.

4. The method of claim 1, the plurality of battery cells comprising different battery types.

5. The method of claim 1, further comprising wire bonding a segmented group of the plurality of battery cells using a continuous wire thread.

6. The method of claim 5, further comprising mechanically isolating the segmented group from other segmented groups of the plurality of battery cells.

7. The method of claim 5, further comprising threading the continuous wire thread to form a bus along which current can travel from a cathode portion of the segmented group of the plurality of battery cells to an anode section of one or more conducting nails of the plurality of conducting nails.

8. The method of claim 1, further comprising placing the plurality of battery cells within the cavities of the plurality of battery cell isolation sleeves such that a cathode side of the plurality of battery cells faces away from the printed circuit board of the resulting MVCM, wherein the plurality of conducting nails couple a cathode portion of the plurality of battery cells to the printed circuit board.

9. The method of claim 1, wherein the printed circuit board is electrically coupled to all battery cells of the resulting MVCM.

10. A method of manufacture of a multi-voltage configurable module (MVCM) comprising:
    placing a plurality of battery cell isolation sleeves within a body of a main housing;
    placing a plurality of battery cells within cavities of the plurality of battery cell isolation sleeves, each of the plurality of battery cells being placed in a separate battery cell isolation sleeve;
    attaching a printed circuit board to a bottom portion of the main housing, the printed circuit board being coupled to a plurality of output terminals;
    coupling a plurality of conducting nails to the plurality of battery cells and the printed circuit board, wherein the plurality of conducting nails extend from a cathode side of the plurality of battery cells to the printed circuit board when so coupled; and
    attaching a top cover to a top portion of the main housing.

11. The method of claim 10, further comprising placing a cell retention tray adjacent the top portion of the main housing to enclose the plurality of battery cells, wherein:
    the cell retention tray is a single structure; and
    the cell retention tray retains all battery cells of the resulting MVCM.

12. The method of claim 10, the plurality of battery cells comprising different battery types.

13. The method of claim 10, further comprising wire bonding a segmented group of the plurality of battery cells using a continuous wire thread.

14. The method of claim 13, further comprising mechanically isolating the segmented group from other segmented groups of the plurality of battery cells.

15. The method of claim 13, further comprising threading the continuous wire thread to form a bus along which current can travel from a cathode portion of the segmented group of the plurality of battery cells to an anode section of one or more conducting nails of the plurality of conducting nails.

16. The method of claim 10, further comprising placing the plurality of battery cells within the cavities of the plurality of battery cell isolation sleeves such that the cathode side of the plurality of battery cells faces away from the printed circuit board of the resulting MVCM, wherein the plurality of conducting nails couple a cathode portion of the plurality of battery cells to the printed circuit board.

17. The method of claim 10, wherein the printed circuit board is electrically coupled to all battery cells of the resulting MVCM.

18. The method of claim 10, wherein attaching the top cover to the top portion of the main housing comprises detachably coupling the top cover to the top portion.

19. The method of claim 18, comprising attaching the top cover to the top portion using screws or pins.

20. The method of claim 10, further comprising attaching a plurality of burst discs to the top cover.

21. The method of claim 10, further comprising:
attaching a plurality of conducting springs to the bottom portion of the main housing; and
attaching the printed circuit board to the plurality of conducting springs.

* * * * *